(12) United States Patent
Mukai et al.

(10) Patent No.: US 6,844,870 B2
(45) Date of Patent: Jan. 18, 2005

(54) DATA PROCESSING APPARATUS, IMAGE DISPLAYING APPARATUS, AND INFORMATION PROCESSING SYSTEM INCLUDING THOSE

(75) Inventors: Masaki Mukai, Hyogo (JP); Naoyuki Ito, Hyogo (JP); Osamu Kamo, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 383 days.

(21) Appl. No.: 09/747,681

(22) Filed: Dec. 26, 2000

(65) Prior Publication Data

US 2002/0041262 A1 Apr. 11, 2002

(30) Foreign Application Priority Data

Oct. 6, 2000 (JP) ........................................ 2000-307274

(51) Int. Cl.[7] ................................................ G09G 5/08
(52) U.S. Cl. ........................ 345/158; 345/536; 345/618; 345/169
(58) Field of Search ................................ 345/158, 156, 345/157, 169, 536, 618, 520

(56) References Cited

U.S. PATENT DOCUMENTS

| | | | | |
|---|---|---|---|---|
| 5,526,422 A | * | 6/1996 | Keen | 379/396 |
| 5,838,926 A | * | 11/1998 | Yamagishi | 709/249 |
| 6,256,008 B1 | * | 7/2001 | Sparks et al. | 345/618 |
| 6,278,887 B1 | * | 8/2001 | Son et al. | 455/566 |
| 6,356,269 B1 | * | 3/2002 | Nakatsuka et al. | 345/505 |
| 6,385,250 B1 | * | 5/2002 | Kondo et al. | 375/240.27 |
| 6,556,131 B1 | * | 4/2003 | Besharat et al. | 340/7.55 |
| 6,784,872 B1 | * | 8/2004 | Matsui et al. | 345/169 |
| 2001/0028727 A1 | * | 10/2001 | Naito et al. | 382/100 |
| 2002/0054330 A1 | * | 5/2002 | Jinbo et al. | 358/1.15 |

OTHER PUBLICATIONS

Sony Catalog "Air Board", Feb. 6, 2001, 9 pages with partial abstract.

* cited by examiner

Primary Examiner—Regina Liang
Assistant Examiner—Kimnhung Nguyen
(74) Attorney, Agent, or Firm—RatnerPrestia

(57) ABSTRACT

A CPU of an image display apparatus transmits user manipulation to an input unit to a wireless unit of a data processing apparatus through a wireless unit, and a CPU of the data processing apparatus processes corresponding to the user manipulation. The CPU of the data processing apparatus generates image data, and transmits to the wireless unit of the image display apparatus through its own wireless unit, and the CPU of the image display apparatus displays this image data in its display unit. Accordingly, the information processing system divided into the data processing apparatus and image display apparatus, and capable of carrying easily the image display apparatus can be presented.

23 Claims, 18 Drawing Sheets

Fig. 12
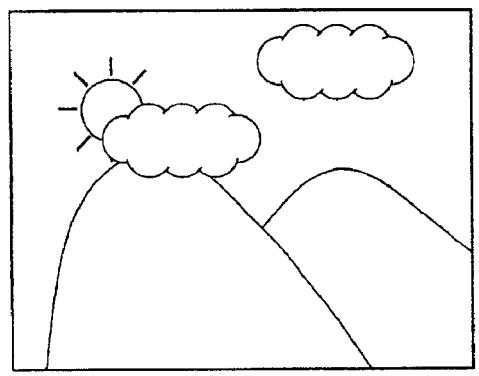
(a)
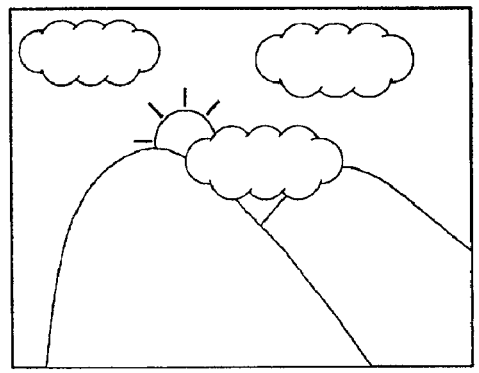
(b)
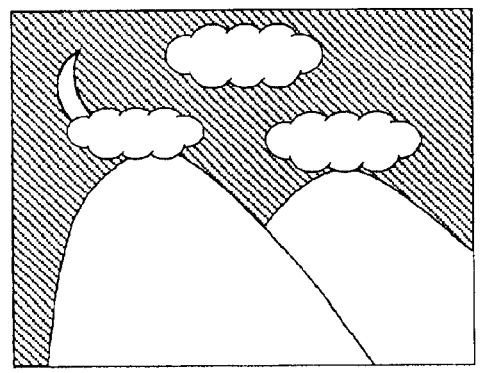
(c)

Fig. 14
(a)
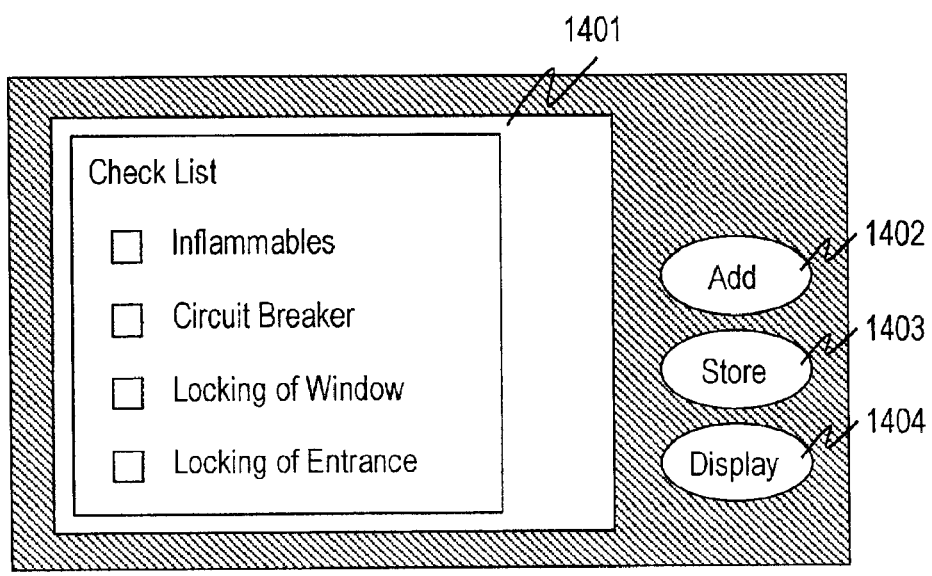
(b)
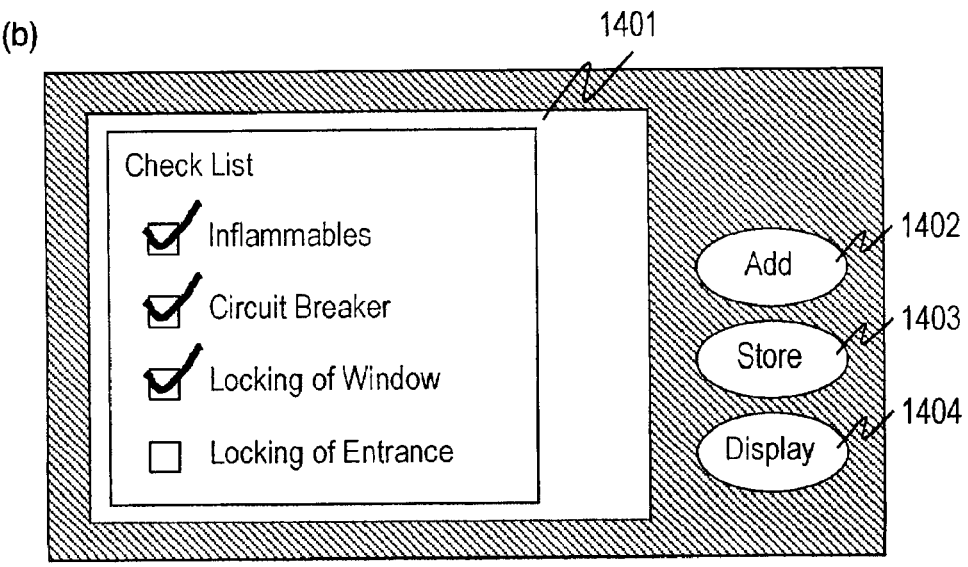

Fig. 16
(a)
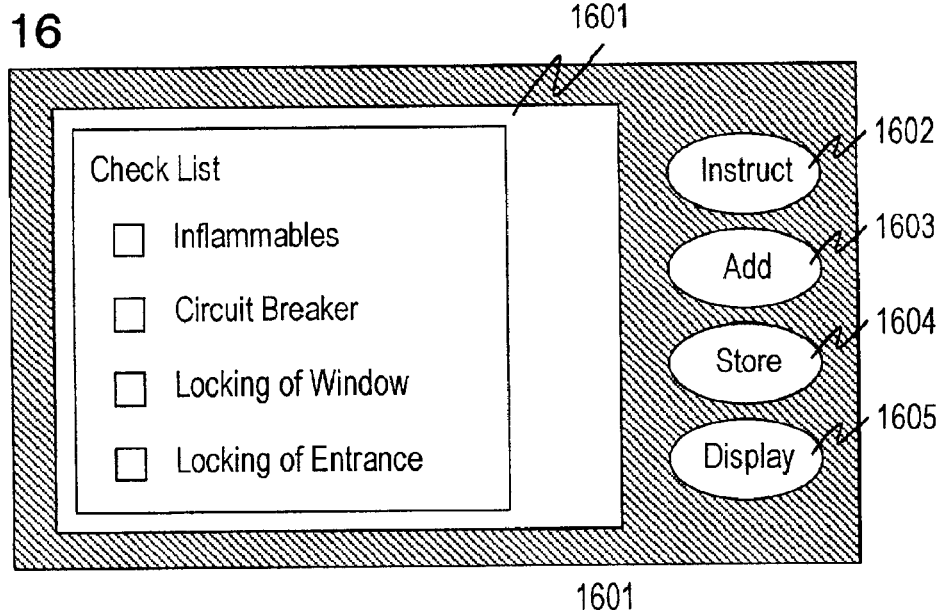
(b)
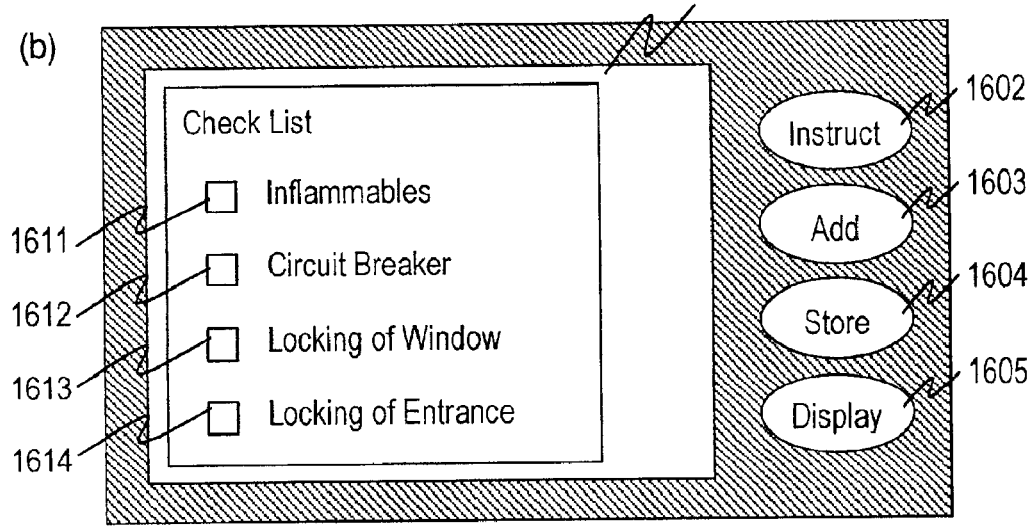
(c)
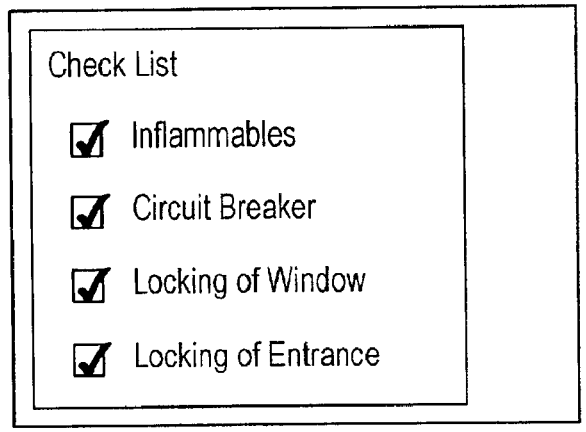

DATA PROCESSING APPARATUS, IMAGE DISPLAYING APPARATUS, AND INFORMATION PROCESSING SYSTEM INCLUDING THOSE

FIELD OF THE INVENTION

The present invention relates to a data processing apparatus for receiving user's input into an image display apparatus by wireless means in order to process image and user manipulation of personal computer, television or the like, and transmitting image data as a result of processing on the basis of this input to the image display apparatus by wireless means, the image display apparatus for transmitting user's input to the data processing apparatus by wireless means, and displaying the image data as a result of processing sent from the data processing apparatus by wireless means, and an information processing system containing such data processing apparatus and image display apparatus.

BACKGROUND OF THE INVENTION

Information processing apparatuses are used in various fields recently, and methods of use are extended in the background of advanced performance of microprocessor, larger capacity of memory and storage apparatus, lower price of apparatuses.

FIG. 17 is a block diagram of a hardware configuration of a conventional information processing apparatus. As shown in the diagram, the conventional information processing apparatus comprises a CPU 1701, a memory 1702, a secondary storage unit 1703, an input unit 1704, and a display unit 1705.

In the information processing apparatus having such configuration, the operation is explained below. First, a user's instruction is given to the input unit 1704. Next, the CPU 1701 processes according to the program stored in the memory 1702 and the instruction from the input unit 1704, and displays the result of processing in the display unit 1705. At this time, the program and data are exchanged among the CPU 1701, memory 1702, and secondary storage unit 1703.

Some of the information processing apparatuses having the display unit are designed to stop output of image by the display unit when a state not manipulated by the user continues for a prescribed time in order to save energy and prevent heat generation. A hardware configuration of such other conventional information processing apparatus is shown in a block diagram in FIG. 18. In FIG. 18, in addition to the composition in FIG. 17, a clock 1801 is provided, and it measures the time until the output of the display unit 1705 is stopped, and when the duration exceeds a specified time, the output of the display unit 1705 is stopped.

In the output stop state of the display unit 1705, when any user manipulation is given from the input unit 1704, the CPU 1701 generates an image to be displayed in the display unit 1705 according to the program stored in the memory 1702, and the display unit 1705 shows the image again.

In such conventional information processing apparatuses, however, since the CPU is required to have a high processing capacity, power consumption is large, and a heat release structure or large power source is needed. In addition, a secondary storage such as FDD, HDD, CD-ROM is often necessary. It results in a large size and a heavy weight, and it is hard to carry in and work.

Further, in an information processing apparatus having a function of stopping the output of the display unit, in order to display again from the image output stopped state, the CPU executes a program and generates image or data to be displayed. As a result, processing for data generation is complicated, and if it is necessary to acquire data through some communication medium, it takes time until the image is restored in the display unit.

Lately, in a mode based on client server model, by operating a data processing function, and a processing function of its display or user manipulation by independent apparatuses (respectively called data processing apparatus and image display apparatus), a system for connecting them by communication is being developed and employed. In this configuration, at the data processing apparatus side, the result processed corresponding to the user manipulation from the image display apparatus side is sent to the image display apparatus as a drawing command, and at the image display apparatus side, an image is generated according to this drawing command and displayed, so that it appears to be operated by one apparatus. In particular, owing to the progress in the wireless technology, the apparatuses are connected by wireless communication, and the portability of the image display apparatus is enhanced.

In such system for connecting the data processing apparatus and image display apparatus by wireless communication, the image display apparatus is easier to use, but the system does not function if the wireless communication fails between the two apparatuses due to trouble.

SUMMARY OF THE INVENTION

It is hence a first object of the invention to realize a portable image display apparatus by dividing the information processing system into a data processing apparatus and an image display apparatus, and transmitting the image data as a result of processing at the data processing apparatus side to the image display apparatus side by wireless means, thereby reducing the size of the image display apparatus.

In a system of quick response of image processing and temporary stop of output of the display unit, a data processing apparatus and an image display apparatus quick in restoration of image, and an information processing system comprising them are also presented.

It is a second object of the invention to present an image display apparatus capable of referring to a user's desired image even in a place where wireless communication is disabled, by storing the image generated by the data processing apparatus in a wireless connected state of the data processing apparatus and image display apparatus, and displaying the stored image when the wireless communication is disabled.

The data processing apparatus of the invention corresponding to the first object is a data processing apparatus for processing data on the basis of the received result by wireless communication with an image display apparatus for receiving user's input, comprising a CPU, a memory, and a wireless unit, in which the user's input manipulation result entered in the image display apparatus is received through the wireless unit, and the image data generated as a result of data processing on the basis of the received result is transmitted to the image display apparatus through the wireless unit.

The image display apparatus for this purpose comprises a wireless unit, a display unit, and an input unit, in which the user's input manipulation result in the input unit is transmitted to the data processing apparatus as set forth in claim 1 by the wireless unit, and in the data processing apparatus, the image of the result of information processing on the basis of the input manipulation result is received in the wireless unit, and displayed in the display unit.

Also the information processing system for the purpose comprises the data processing apparatus and image display apparatus, in which the user's input manipulation result in the input unit of the image display apparatus is transmitted to the data processing apparatus by the wireless unit of the image display apparatus, the data processing apparatus transmits the image data as a result of information processing on the basis of the received content from the image display apparatus to the image display apparatus, and the image display apparatus displays the received image in the display unit.

By this configuration of the apparatuses and system, the structure is divided into the data processing apparatus and image display apparatus, which are not required to be connected by cable or the like, and only the image display apparatus can be brought in and used, and the portability of the image display apparatus is enhanced because most of the processing is done in the data processing apparatus.

The image display apparatus further comprises a wireless quality measuring unit for measuring the wireless quality, and when the wireless quality measuring unit judges that the wireless quality is inferior to the specified quality, it can turn off the display screen of the display unit.

The information processing system further comprises a wireless quality measuring unit for the image display apparatus to measure the wireless quality, and when the wireless quality measuring unit judges that the wireless quality is inferior to the specified quality, it can turn off the display screen of the display unit.

In the constitution of the image display apparatus and information processing system, by turning off the screen display if the user manipulation cannot be transmitted to the data processing apparatus or the image cannot be transmitted to the image display apparatus due to wireless quality trouble, meaningless screen display can be suppressed, and the power consumption can be saved and heat generation can be prevented.

Moreover, the image display apparatus stores the image shown in the display unit when turning off the display screen of the display unit, and displays the stored image first when restoring the display screen by user's input manipulation, and then updates to the latest screen transmitted from the data processing apparatus.

The information processing system stores the image shown in the display unit when turning off the display screen of the display unit, and displays the stored image first when restoring the display screen by user's input manipulation, and then updates to the latest screen transmitted from the data processing apparatus.

By the configuration of the image display apparatus and information processing system, since the screen can be presented to the user immediately from the display screen off state, a quick response is possible when the image to be shown in the display unit is no so much different from the latest image.

The data processing apparatus can control so that the image data transmitted from the wireless unit may be only the differential portion.

In the information processing system, it can be controlled so that the image data transmitted from the wireless unit of the data processing apparatus to the wireless unit of the image display apparatus may be only the differential portion.

In the configuration of the image display apparatus and information processing system, the quantity of data transmitted from the wireless unit of the data processing apparatus can be curtailed, and the transmission time can be shortened, so that the screen updating speed can be enhanced.

The image display apparatus of the invention corresponding to the second object is an image display apparatus for displaying the image data received from the data processing apparatus by wireless communication with the data processing apparatus which generates image data and transmits the data by wireless means, comprising wireless communication means, display means for displaying the image received in the wireless communication means, storage means for storing one or more image data, input means for receiving user's instruction, image storage control means for storing the image displayed in the display means according to the instruction of image storing received in the input means in the storage means, and image display control means for displaying one or more images stored in the storage means according to the instruction of the image display received in the input means in the display means.

In this constitution, by storing and referring to the image data displayed in the display means transmitted from the data processing apparatus by wireless means according to the user manipulation, user's desired image can be presented even in a situation unable to communicate by wireless means.

Also, the image display apparatus corresponding to the second object is an image display apparatus for displaying the image data received from the data processing apparatus by wireless communication with the data processing apparatus which generates image data and transmits the data by wireless means, comprising wireless communication means, display means for displaying the image received in the wireless communication means, storage means for storing one or more image data, image update detecting means for detecting update of the image displayed in the display means, updated image storage control means for adding and storing the image displayed in the display means in the storage means corresponding to detection of image update by the image update detecting means, input means for receiving user's instruction, and image display control means for displaying one or more images stored in the storage means according to the instruction of the image display received in the input means in the display means.

In this constitution, in a wireless communication enabled situation, by automatically detecting and storing the update of the image by a specific condition, the image can be stored without user's instruction.

In the image display apparatus, the image update detecting means detects updating of the image when the size of the image updated within a specified time is larger than a predetermined size.

Therefore, the image is stored automatically when the updated image is large.

In the image display apparatus, the input means receives an instruction of image update from the user, and image updating means is further provided to update the image stored in the storage means and displayed in the display means according to the instruction of the image update received in the input means.

Accordingly, by adding or updating the image stored in the image display apparatus alone, in a wireless communication disabled situation, the stored image can be utilized more effectively.

Further, in the image display apparatus, the memory means stores the series of user manipulation of each image data in correspondence to the pertinent image data, in addition to the image data, the input means further receives the user manipulation of the image stored in the storage means and displayed in the display means and stores the series temporarily, the image storage control means stores the series of user manipulation stored in the input means in addition to the image in the storage means in correspondence to the image, and the wireless communication means can transmit the user manipulation information to the data processing apparatus, aside from receiving the image data.

Therefore, by displaying the stored image so that the screen may be manipulated in wireless communication disabled state, when wireless communication is resumed, the content is put in the image display apparatus, so that the stored image may be more effectively utilized.

BRIEF DESCRIPTION OF THE DRAWINGS

FIG. 12 is a diagram showing an example of image displayed by display means of the image display apparatus in the fifth embodiment of the invention.

FIG. 14A is an appearance drawing of the image display apparatus in the sixth embodiment of the invention.

FIG. 14B is an appearance drawing of other state of the same image display apparatus.

FIG. 16A is an appearance drawing of the image display apparatus in the seventh embodiment of the invention.

FIG. 16B is an appearance drawing of other state of the same image display apparatus.

FIG. 16C shows an example of a document displayed by the same image display apparatus.

DETAILED DESCRIPTION OF THE EMBODIMENTS (Embodiment 1)

Figure 1:
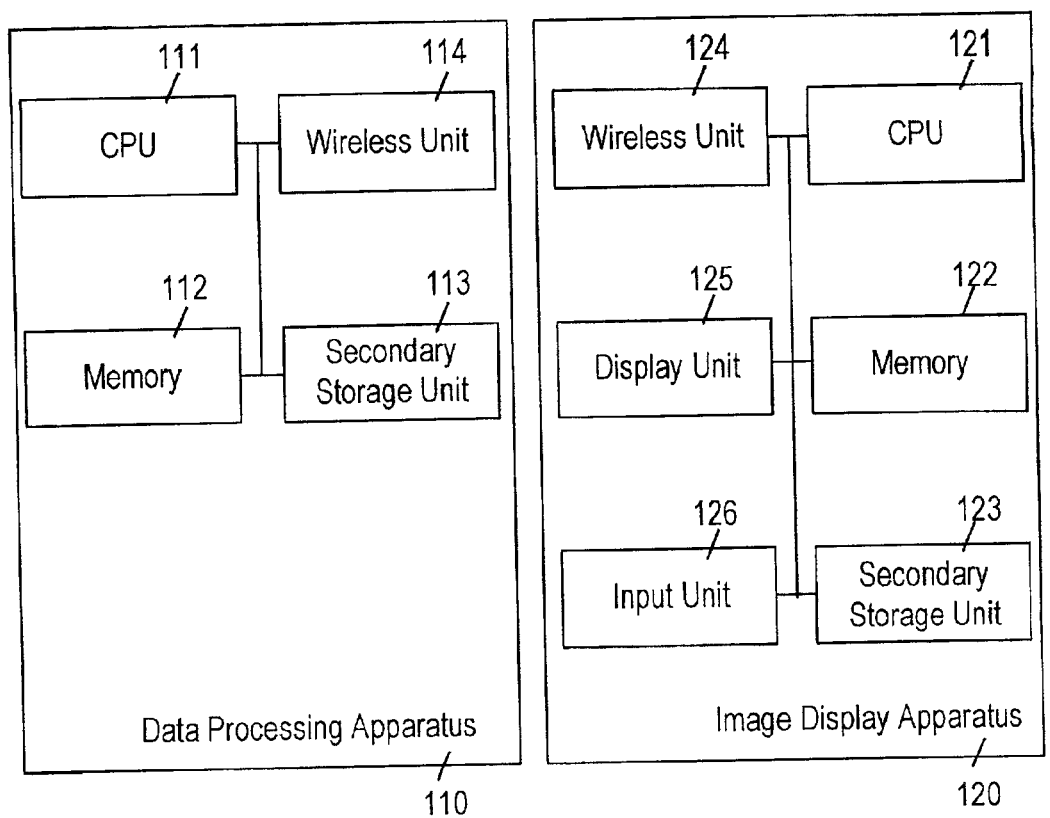
FIG. 1 is a block diagram showing a hardware configuration of an information processing apparatus in a first embodiment of the invention.

FIG. 1 is a block diagram showing a hardware configuration of an information processing system in a first embodiment of the invention. In FIG. 1, the information processing system of the embodiment is composed of a data processing apparatus 110 and an image display apparatus 120. The data processing apparatus 110 comprises a CPU 111, a memory 112, a secondary storage unit 113, and a wireless unit 114. The image display apparatus 120 comprises a CPU 121, a memory 122, a secondary storage unit 123, a wireless unit 124, a display unit 125, and an input unit 126.

The data processing apparatus 110 includes the wireless unit 114 (a apparatus known as wireless LAN card or the like) for wireless communication with a conventional personal computer (PC) mounting, for example, Windows of Microsoft which is a widely used operating system (OS), and omits display unit such as CRT or liquid crystal display (LCD), and input unit such as keyboard or mouse. The OS is not limited to Windows alone. The CPU 111, memory 112 and secondary storage unit 113 are same as those used in the existing PC.

The CPU 111 generates the image to be displayed while exchanging data between the memory 112 and secondary storage unit 113 according to a program stored in the second storage unit 113, that is, the data to be displayed on the screen of the display unit of ordinary PC, and transmits the data to the image display apparatus 120 through the wireless unit 114.

The wireless unit 114 is a wireless Local Area Network card (wireless LAN card) conforming, for example, to IEEE802.11a, IEEE802.11b, or the like, for realizing fast wireless communication. Besides, Bluetooth proposed by Bluetooth Special Interest Group can be also used, and other wireless communication standards are also applicable. Alternatively, instead of such electromagnetic waves, infrared ray communication specified by IrDA or the like may be also usable.

In the image display apparatus 120, the wireless unit 124 can communicate with the wireless unit 114 of the data processing apparatus 110. The CPU 121 converts the reception data received from the wireless unit 114 of the data processing apparatus 110 in the wireless unit 124 into a format to be displayed in the display unit 125 using LCD or the like, by using the memory 122 and secondary storage unit 123 according to a program stored in the secondary storage unit 123.

The input unit 126 acquires the content manipulated by the user, and the CPU 121 instructs the wireless unit 124 to transmit the acquired content. The input unit 126 may be keyboard or mouse, but to reduce in size, it is preferred to use keypad, track ball or tablet. Further, the LCD of the display unit 125 and the touch panel of the input unit 126 may be integrated, and a apparatus to be manipulated by indicating the display surface by pen or finger may be realized. As the display unit 126, although the size is larger, the CRT or plasma display may be also used.

Having such configuration, the operation of the system is explained below. The data processing apparatus 110 and image display apparatus 120 operate in pair for transmitting and receiving data through their respective wireless unit 114 and wireless unit 124.

In the image display apparatus 120, the user manipulates the input unit 126. The CPU 121 controls and instructs the wireless unit 124 to transmit the input content. In the data processing apparatus 110, on the basis of the user manipulation in the image display apparatus 120 received in the wireless unit 114 through wireless communication, or on the basis of the change of the internal state of the data processing apparatus 110 or image display apparatus 120, the CPU 111 processes while exchanging data between the memory 112 and secondary storage unit 113 according to the program stored in the secondary storage unit 113, and generates image data to be displayed in the image display apparatus 120.

The generated image data is transmitted from the wireless unit 114, and this data is received in the wireless unit 124 of the image display apparatus 120, and the CPU 121 processes according to the program stored in the secondary storage unit 123 to convert the received data into a format to be displayed in the display unit 125 by using the memory 122 and secondary storage unit 123, and displays in the display unit 125.

Herein, the difference from the prior art of the data processing apparatus and image display apparatus connected through wireless communication is as follows: in the conventional system, the data processing apparatus side sends a drawing command to the image display apparatus side, and the image display apparatus side generates and displays the image data according to this drawing command, but in the embodiment, the image data itself is sent to lessen the load at the image display apparatus side, and hence the image display apparatus 120 is reduced in size and weight, thereby contributing to enhancement of portability.

When the data processing apparatus 110 transmits image data to the image display apparatus 120, all data may be transmitted every time, but in order to reduce the quantity of transmission data, only the differential portion of the image data transmitted last time and the data to be displayed in the screen after the last transmission may be transmitted. Considering a possibility of existence of error in the differential data, the object of comparison may be image data at a specific time. Among various methods of extracting differential data, for example, all pixel data are compared to find presence or absence of difference, or to shorten the extraction time, image data is divided into an arbitrary block size, and pixels in the block are compared, and if only one pixel is different, comparison of pixels in this block is stopped, and the data of the entire block may be transmitted. Alternatively, by comparing at an arbitrary width and an arbitrary line interval, the difference may be detected without comparing all pixel data. Or when a differential detection amount exceeds a certain threshold, the differential detection is stopped, and the entire image may be transmitted. In this manner, the transfer data quantity or differential detection processing quantity is reduced, so that the image update speed in the image display apparatus 120 may be enhanced.

Thus, the data processing apparatus 110 does not include display unit and input unit, and the image display apparatus 120 does not include means for processing user input data and generating image to be displayed, but by the wireless communication processing of the data processing apparatus 110 and image display apparatus 120, it appears that all processing is done by the image display apparatus 120 only.

According to the embodiment, the input and output portions for the user, that is, the input unit and display unit are provided in the image display apparatus, and the portion for generating the image to be presented to the user on the basis of the user manipulation or other factor not by user manipulation is provided in the data processing apparatus, and the both apparatuses are separated, and data is exchanged by wireless communication, and therefore only the image display apparatus may be brought in and used, and also the weight is reduced and power consumption is saved.

In the embodiment, the input unit and display unit are omitted in the data processing apparatus 110, but if they are provided, it can be also combined with the image display apparatus 120.

Also in the embodiment, the parts of the hardware are responsible for individual functions, but some or all of these functions can be realized by the software operated by the CPU.

(Embodiment 2)

Figure 2:
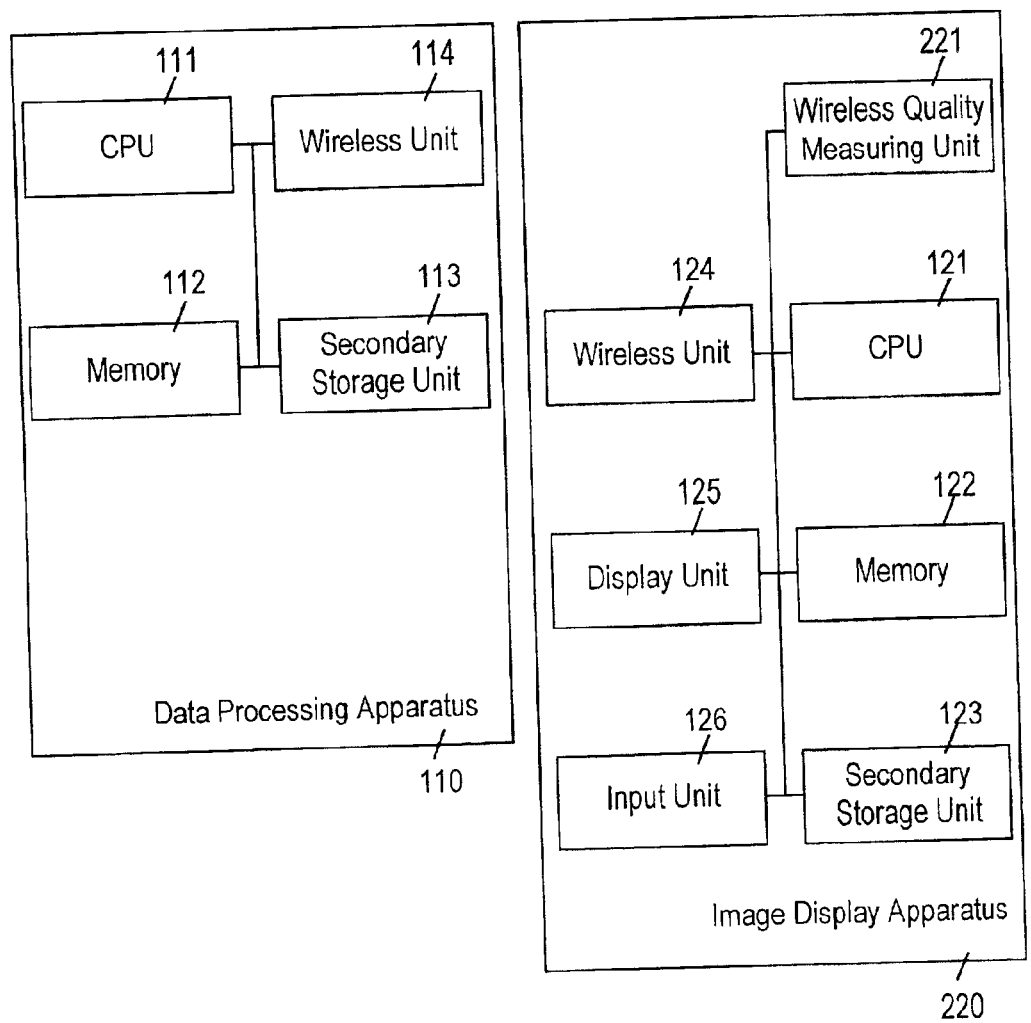
FIG. 2 is a block diagram showing a hardware configuration of an information processing apparatus in a second embodiment of the invention.

FIG. 2 is a block diagram showing a hardware configuration of an information processing apparatus in a second embodiment of the invention. In FIG. 2, a data processing apparatus 110 is same as in the first embodiment including all the constituent elements. In an image display apparatus 220, a CPU 121, a memory 122, a secondary storage unit 123, a wireless unit 124, a display unit 125, and an input unit 126 are same as those provided with same reference numerals in the first embodiment, and a wireless quality measuring unit 221 is further provided.

The wireless quality measuring unit 221 monitors the quality of wireless communication transmitted and received through the wireless unit 124 by the control of the CPU 121. The quality is evaluated, for example, by the error rate of received data, and when the wireless quality measuring unit 221 judges that the quality of the wireless communication is below a specified value, the CPU 121 stops output of image to the display unit 125.

In this constitution, the screen is automatically turned off if the image display apparatus 220 and data processing apparatus 110 are too remote from each other, an obstacle gets in between them, or incoming noise increases, thereby worsening the wireless quality.

In the embodiment, since the screen is turned off when the wireless quality is impaired by adding the wireless quality measuring means, it can suppress useless consumption of power by display of screen in a situation difficult to manipulate from the input unit or display normal image. It also prevents inconvenience for the user by obtaining wrong information from a former image displayed on the screen which is not updated to the latest state.

(Embodiment 3)

Figure 3:
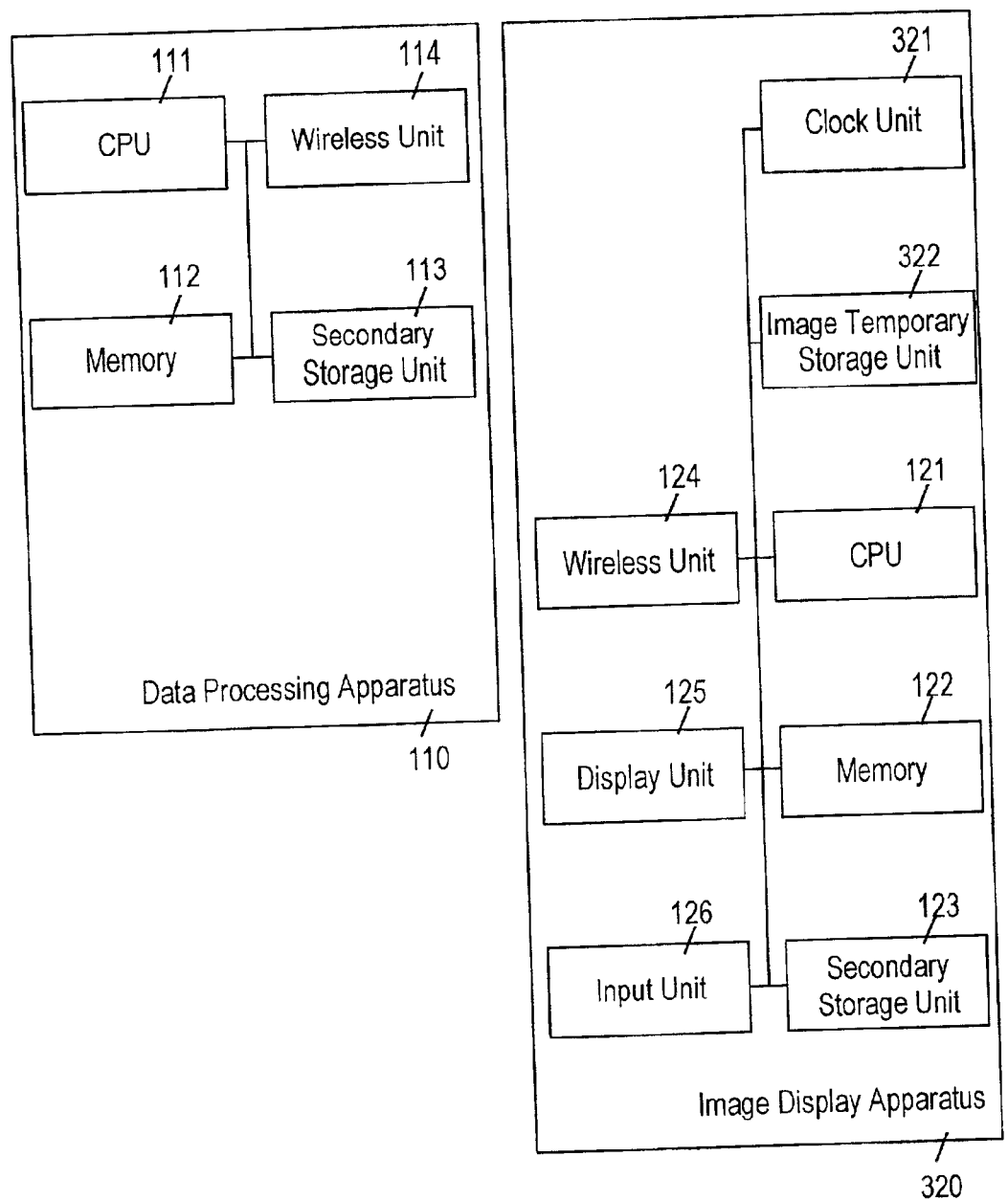
FIG. 3 is a block diagram showing a hardware configuration of an information processing apparatus in a third embodiment of the invention.

FIG. 3 is a block diagram showing a hardware configuration of an information processing apparatus in a third embodiment of the invention. In FIG. 3, a data processing apparatus 110 is same as in the first and second embodiments including all the constituent elements. In an image display apparatus 320, a CPU 121, a memory 122, a secondary storage unit 123, a wireless unit 124, a display unit 125, and an input unit 126 are same as those provided with same reference numerals in the first and second embodiments.

A clock 321 monitors the user input from the input unit 126, and measures the time of no user input. An image temporary storage unit 322 stores the data of at least one screen displayed in the display unit 125 according to the instruction of the CPU 121.

Figure 4:
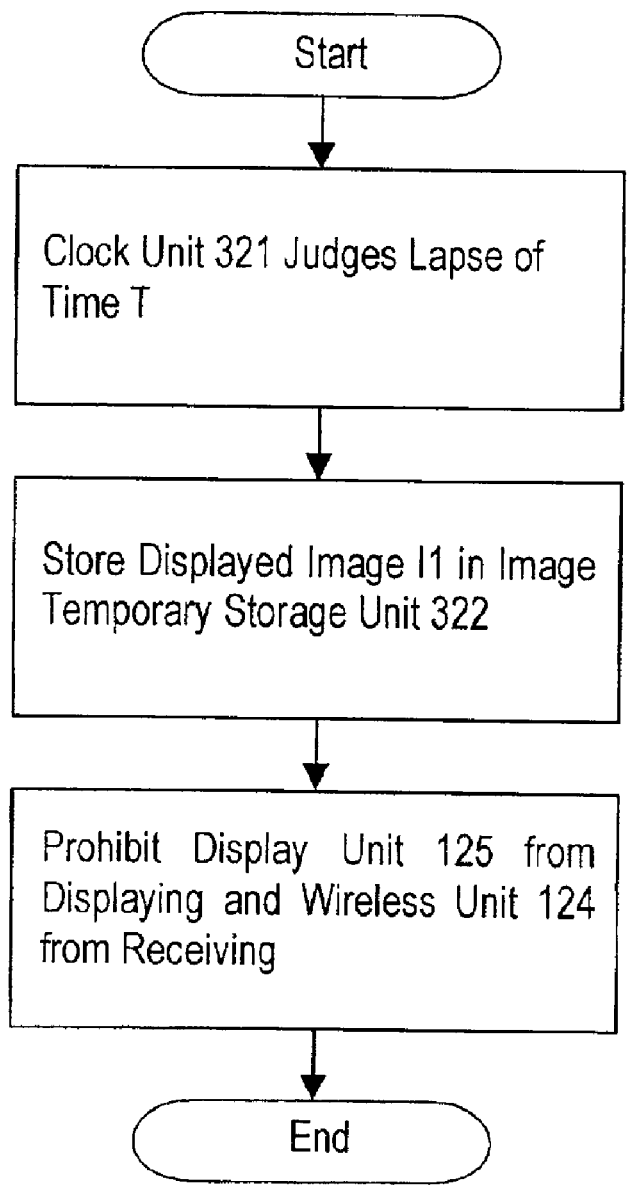
FIG. 4 is a flowchart showing an operation example of the information processing apparatus in the third embodiment of the invention.

In the information processing system of the embodiment having such configuration, if there is no user manipulation in the input unit 126 for a prescribed time, the operation is explained by referring to the flowchart in FIG. 4.

(Step 401) The CPU 121 detects the duration of prescribed time T on the basis of the measurement by the clock 321, and goes to step 402.

(Step 402) The CPU 121 stores data I1 of the entire image displayed in the display unit 125 in the image temporary storage unit 322, and goes to step 403.

(Step 403) The CPU 121 stops the display of the display unit 125 and the data reception of the wireless unit 124, and terminates the process.

Figure 5:
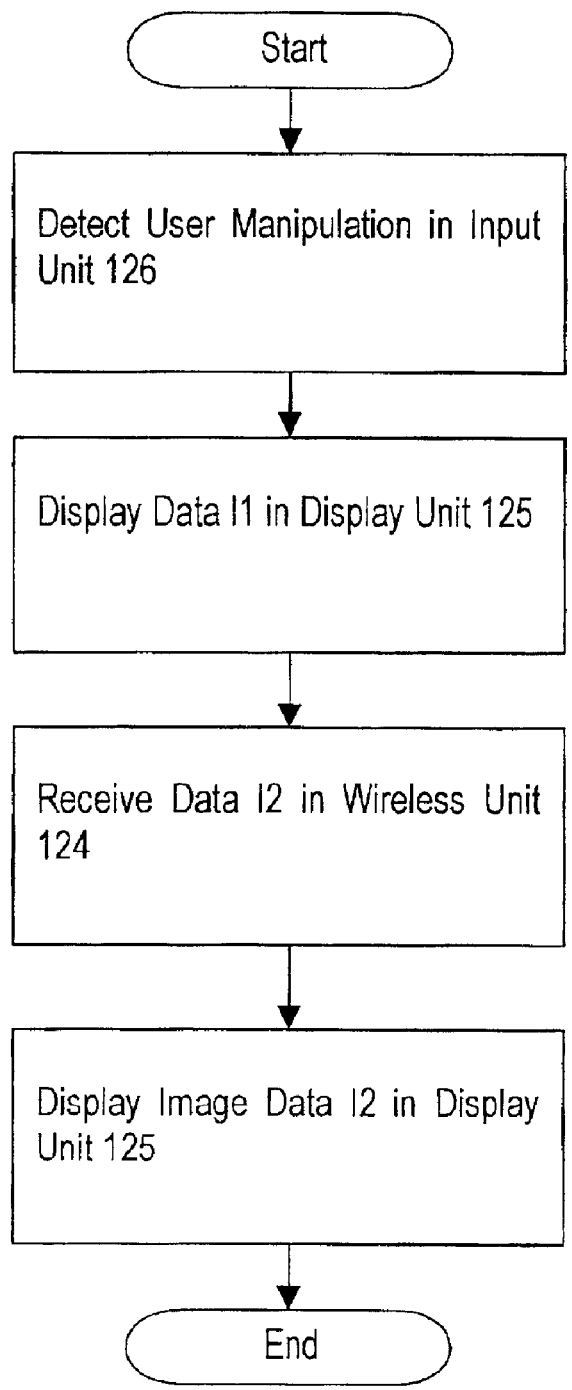
FIG. 5 is a flowchart showing an operation example of the information processing apparatus in the third embodiment of the invention.

In the state after the process at step 403, that is, in the display stopped state of the display unit 125, when the user manipulates the input unit 126, the operation is explained by referring to the flowchart in FIG. 5.

(Step 501) The CPU 121 detects user manipulation from the input unit 126, and goes to step 502.

(Step 502) The CPU 121 displays the data I1 stored in the image temporary storage unit 322 in the display unit 125, and goes to step 503.

(Step 503) The CPU 121 receives data I2 of the latest image from the wireless unit 124, and goes to step 504.

(Step 504) The CPU 121 displays the image data I2 in the display unit 125, and terminates the process.

By the process at step 401 to step 403, if the user does not manipulate for a specified time, the CPU 121 stores the display content in the display unit 125 at this time in the image temporary storage unit 322, and turns off the display of the display unit 125, and by the process at step 501 to step 504, when the user manipulation is resumed, first, the image when the display of the display unit 125 is turned off is taken out from the image temporary storage unit 322, and displays immediately in the display unit 125, and when the wireless unit 124 acquires the latest image, it is displayed in the display unit 125.

Thus, according to the embodiment, the display of the display unit is turned off in order to save power consumption and suppress release of heat, and when stopping data reception in the wireless unit, the image data at this time is stored in the image temporary storage unit, and when the user manipulation in the input unit is restarted, the image data stored in the image temporary storage unit is displayed in the display unit and then the wireless unit resumes reception and receives the latest image, which is shown in the display unit, and therefore the image can be immediately presented corresponding to the user manipulation, so that the response can be enhanced.

In this embodiment, when no operation time continues for a specified duration, display in the display unit and reception in the wireless unit are stopped, or otherwise by using a nonvolatile memory such as flash memory as the image temporary storage unit of the image display apparatus, the display content of the display unit is stored in the nonvolatile memory, and the power source of the entire system is turned off, and when restoring, first, the image data from the nonvolatile memory is displayed in the display unit, and then the latest image data is received from the data processing apparatus, so that the display content of the display unit may be updated.

Also in the embodiment, when resuming the user manipulation, first, the image data stored in the image temporary storage unit is displayed in the display unit, and the reception in the wireless unit is started to receive, and then display content in the display unit is updated, but the time relation of these processes is not limited to the progressive sequence, and, for example, reception of the wireless unit may be started in the first place, and while receiving the data, the content in the image temporary storage unit is displayed in the display unit, and as the reception of image by the wireless unit progresses, the display content in the display unit may be updated sequentially.

(Embodiment 4)

Figure 6:
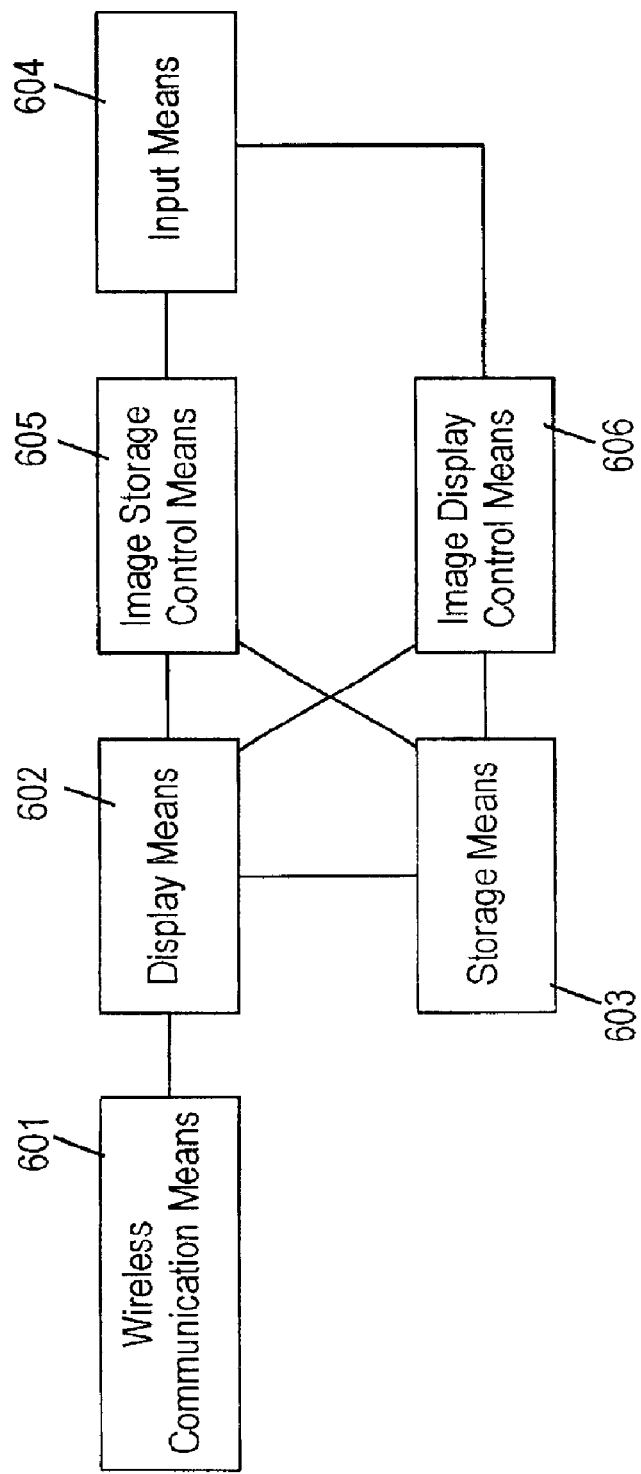
FIG. 6 is a block diagram of an image display apparatus in a fourth embodiment of the invention.

FIG. 6 is a block diagram of an image display apparatus in a fourth embodiment of the invention. In FIG. 6, wireless communication means 601 receives image data transmitted through wireless communication from a data processing apparatus (not shown, but same hardware configuration as data processing apparatus 110 shown in FIG. 1; same hereinafter) for generating images successively. The data processing apparatus generates, for example, data of graphical user interface (GUI) screen of personal computer operating system Windows of Microsoft. In Windows, when the user manipulates the icon or menu, the color is changed, the pop-up menu appears, the folder is opened, or the screen is changed somewhat by execution of program, and the image data is generated corresponding to these changes.

Display means 602 receives and displays the image data received in the wireless communication means 601, and holds a VRAM in its inside. By the operation of the wireless communication means 601 and display means 602, wireless transmitted image data being sequentially generated in the data processing apparatus are sequentially displayed in the display means 602. The display means 602 is composed by including, for example, an LCD 701 in a apparatus shown in FIG. 7.

Storage means 603 stores one or more image data displayed in the display means 602. In this embodiment, the storage means 603 stores one or more still images displayed in the display means 602 at different times. The images to be stored are numbered sequentially from 1, and the number of the image last displayed in the display means 602 and the number of stored images are stored. The storage means 603 is a volatile memory such as DRAM, or nonvolatile memory such as flash memory, or other secondary storage apparatus, which is not specified herein because it is not the essential point of the invention, but anyway a specified area may be assigned for every image data displayed in the display means 602 at a certain time.

Figure 7:
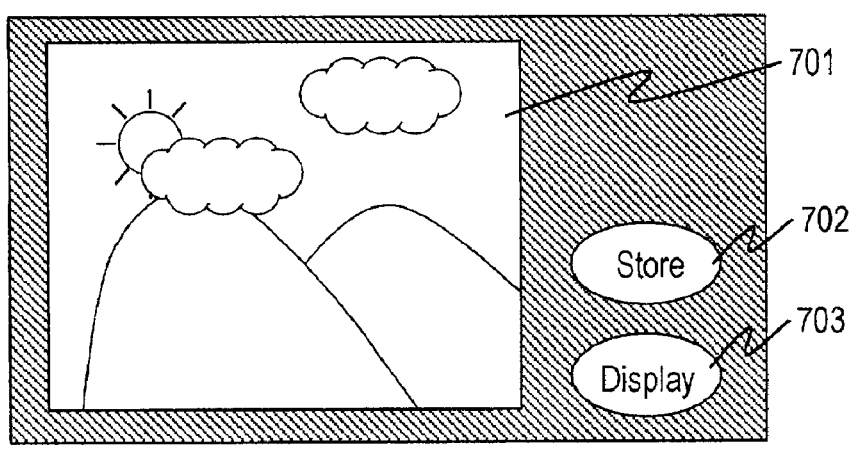
FIG. 7 is an appearance drawing of the image display apparatus in the fourth embodiment of the invention.

Input means 604 receives various instructions by the user, at least an instruction for storing the image data being displayed in the display means 602 in the storage means 603 and an instruction for displaying a desired one of the image data stored in the storage means 603 in the display means 602. For example, the input means 604 has a button 702 and a button 703 as shown in FIG. 7, and when the button 702 is pressed, data storing is instructed, and when the button 703 is pressed, display of an image determined by a predetermined method is instructed. In the method of determining the image to be displayed when the button 703 is pressed, every time the button 703 is pressed, the display object is sequentially selected from the beginning stored in the storage means 603. Or, for example, when the button 703 is pressed continuously for 2 seconds or longer, the display means 602 finishes the display of the images stored in the storage means 603, and the image data received in the wireless communication means 601 are displayed again.

Image storage control means 605 stores the image data being displayed in the display means 602 at a specified position in the storage means 603 according to the input in the input means 604. In the storing process, the content of the VRAM in the display means 602 at this moment is directly copied in a specified area in the storage means 603. It is also possible to design so that the content data in the VRAM compressed by a specific algorithm may be stored in a specified area in the storage means 603. For example, the widely known image data format GIF, or general data compression format ZLIB may be employed.

Image display control means 606 displays a specific one of the image data stored in the storage means 603 in the display means 602 according to the input by the input means 604. Display is processed by copying the data of the image determined on the basis of the input from the input means 604, in the VRAM in the display means 602 from the storage means 603.

Figure 8:
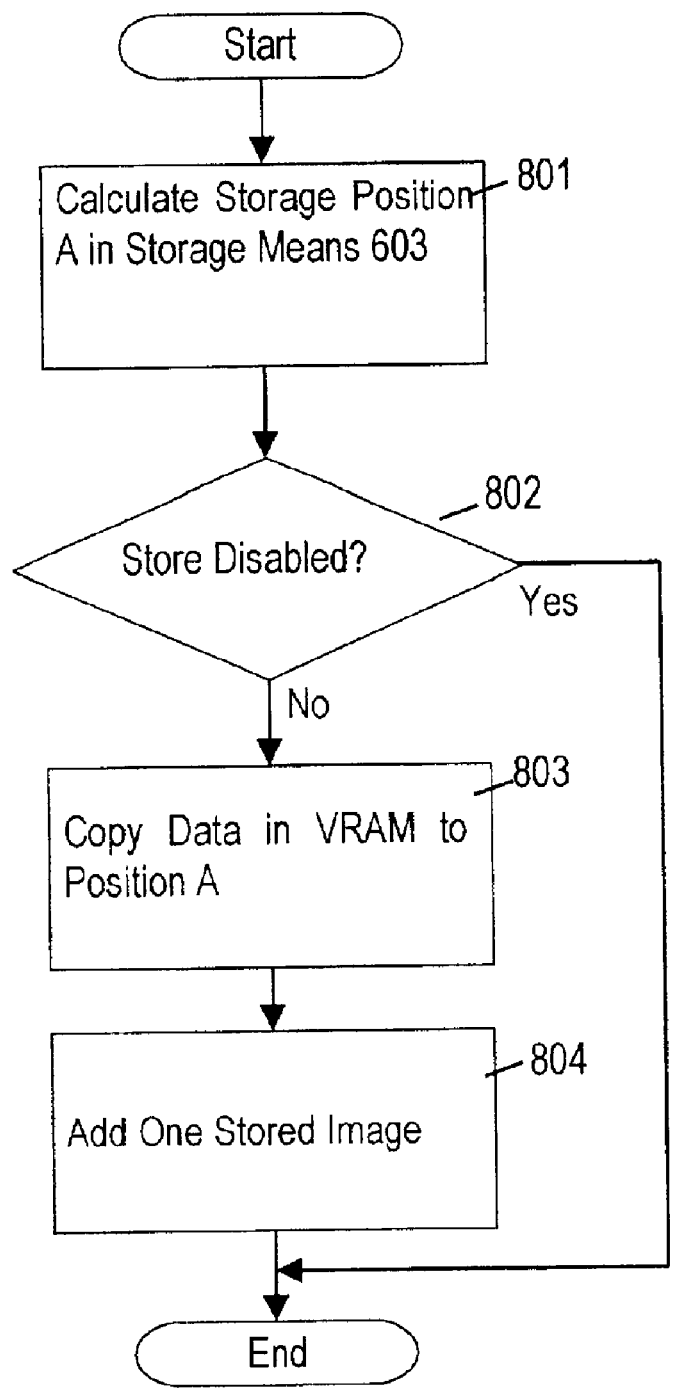
FIG. 8 is a flowchart showing operation of image storage control means of the image display apparatus in the fourth embodiment of the invention.

In the image display apparatus of the embodiment having such configuration, when the input means 604 receives an instruction for data storing from the user, the operation of the image storage control means 605 is explained according to the flowchart in FIG. 8.

(Step 801) The storage means 603 calculates position A in the storage means 603 for storing next image, according to the number of stored images, and goes to step 802.

(Step 802) The storage means 603 terminates the processing if further images cannot be stored, or otherwise goes to step 803.

(Step 803) The displayed image data stored in the VRAM in the display means 602 is copied at position A in the storage means 603, and the process goes to step 804.

(Step 804) The number of images stored in the storage means 603 is increased by one, and the process is terminated.

Figure 9:
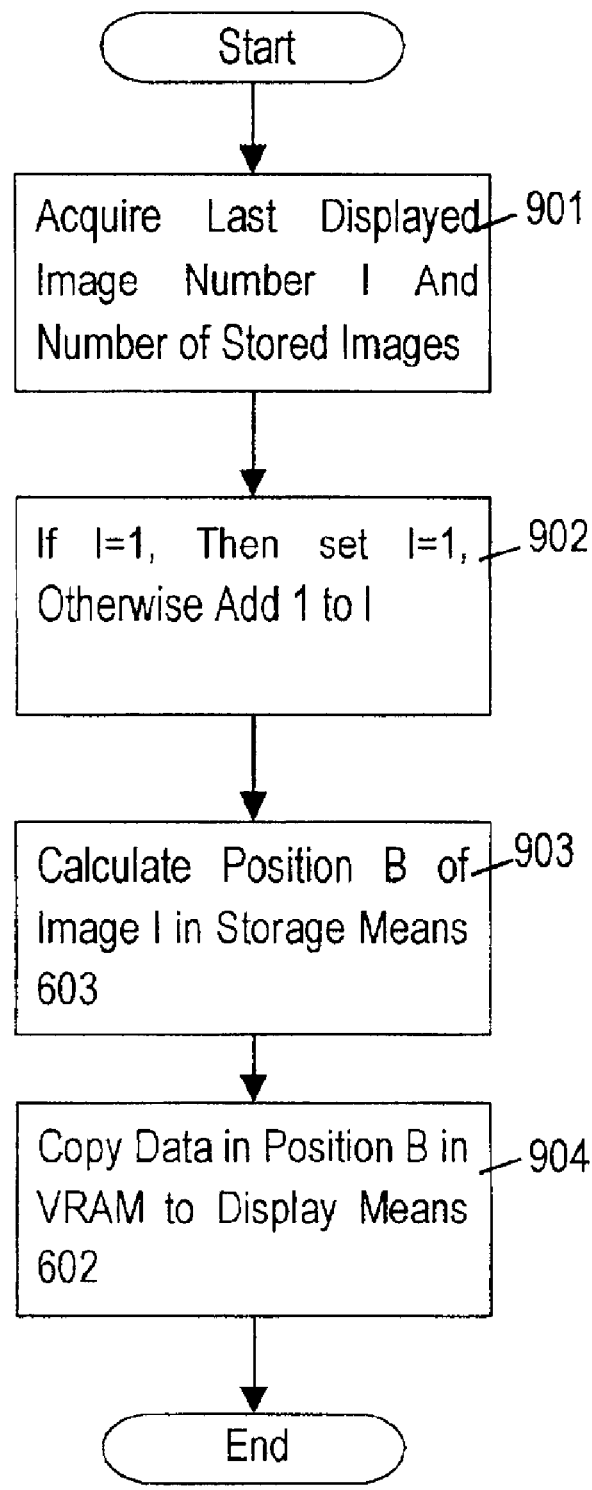
FIG. 9 is a flowchart showing operation of image display control means of the image display apparatus in the fourth embodiment of the invention.

In succession, when the input means 604 receives an instruction of display from the user, the operation of the image display control means 606 is explained according to the flowchart in FIG. 9.

(Step 901) The number I of the last displayed image stored in the storage means 603 and the number N of images stored in the storage means 603 are acquired, and the process goes to step 902.

(Step 902) When I and N are equal, I is set to 1, or otherwise I is increased by 1, and the process goes to step 903.

(Step 903) Calculating position B of the number I of the image stored in the memory means 603, and the process goes to step 904.

(Step 904) The image data stored at position B in the storage means 603 is copied in the VRAM in the display means 602, and the process is terminated.

Thus, according to the embodiment, depending on the user manipulation from the input means 604, images sequentially transmitted from the data processing apparatus by wireless communication and displayed in the display means 602 as being sent through the wireless communication means 601 are stored in the storage means 603. Similarly, depending on the user manipulation from the input means 604, the image data stored in the storage means 603 is displayed in the display means 602. Accordingly, of the images being transmitted from the data processing apparatus, those to be referred to latter are preliminarily stored in the storage means 603, and displayed as required in the display means 602 so as to be referred to whenever desired. In particular, if the data processing apparatus and image display apparatus in the embodiment are departed from each other during wireless communication too far to continue communication, or if the supply of power source to the data processing apparatus is stopped, the user's desired image can be referred to.

In the embodiment, the image display apparatus is shown to store the image in the storage means and refer to sequentially only, but it may be also provided with other functions for deleting the specified image in the storage means, or searching the image by using some data as the key.

As the input means, instead of pressing the button 702 and button 703, a pointing apparatus may be used to click and select an icon on the screen, or a touch panel may be used.

(Embodiment 5)

Figure 10:
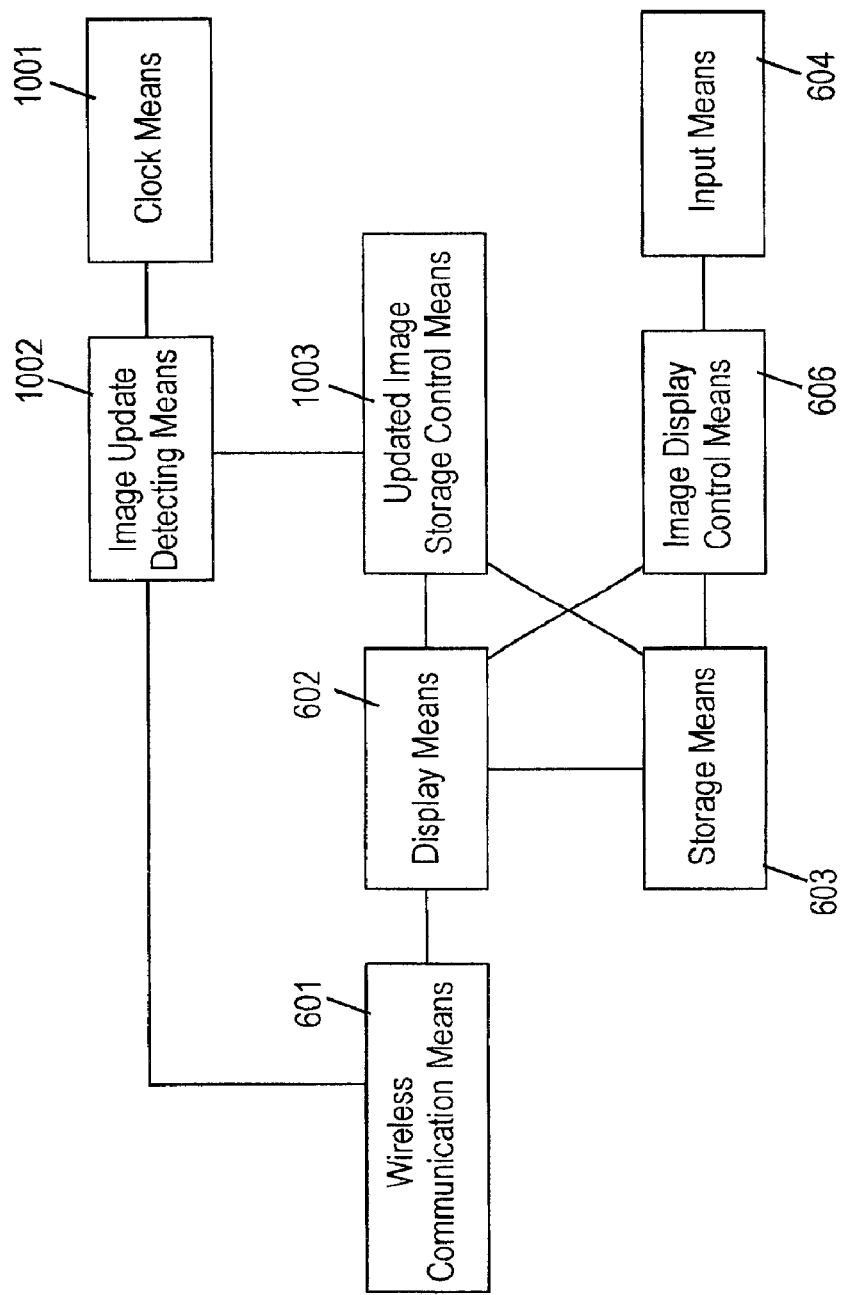
FIG. 10 is a block diagram of an image display apparatus in a fifth embodiment of the invention.

FIG. 10 is a block diagram of an image display apparatus in a fifth embodiment of the invention. In FIG. 10, wireless communication means 601, display means 602, storage means 603, input means 604, and image display control means 606 are same as in the fourth embodiment shown in FIG. 6, and the explanation is omitted.

Clock means 1001 measures a prescribed time, and notices to image update detecting means 1002 repeatedly every time passing this duration. For example, herein, it is noticed to the image update detecting means 1002 at every lapse of 1 second. The image update detecting means 1002 accumulates the areas of image data received by the wireless communication means 601 from the data processing apparatus (not shown) after the image storing process by the updated image storage control means 1003 of last time, and when the accumulation result of the areas of the images exceeds a specified area at the time of notice from the clock means 1001, storing of image is instructed to the updated image storage control means 1003 That is, at every lapse of 1 second, the area of the portion changed from the last stored image is accumulated, and every time exceeding the specified area, the image is stored, and this process is repeated. In this example, after the previous analysis, when a area over ½ of the total area of the image is updated, storing of the image is instructed. The updated image storage control means 1003 stores the image displayed in the display means 602 at the moment in a specified position in the storage means 603 according to the instruction of the image update detecting means 1002. The input means 1004 instructs the image display control means 606 to display the image stored in the storage means 603 in the display means 602.

Figure 11:
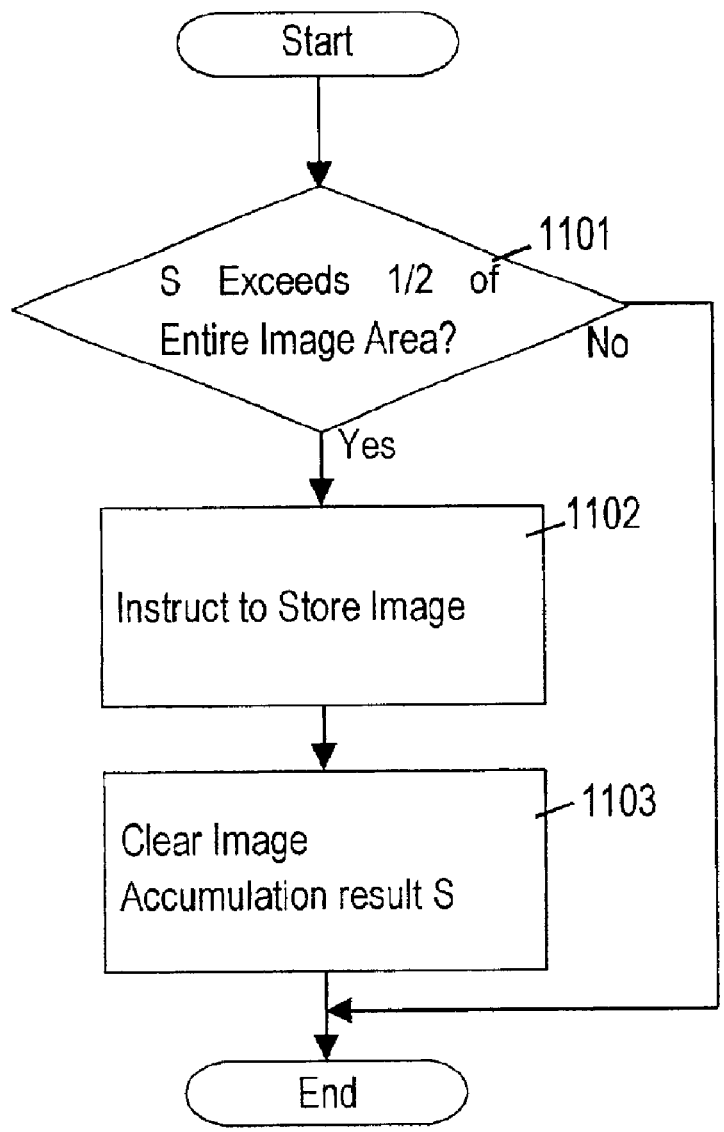
FIG. 11 is a flowchart showing operation of image update detecting means of the image display apparatus in the fifth embodiment of the invention.

In the image display apparatus of the embodiment having such configuration, when the image update detecting means 1002 receives a notice from the clock means 1001, the operation is explained according to the flowchart in FIG. 11. The image update detecting means 1002 is always monitoring reception of image data by the wireless communication means 601, and accumulates the areas. At this time, if the image data of same area is received plural times after storing the last image, the area is not accumulated in duplication.

(Step 1101) The image update detecting means 1002 investigates the accumulation result S of the image areas received in the wireless communication means 601, and when S exceeds ½ of the total area of images, the process goes to step 1102, or otherwise the process is terminated.

(Step 1102) The image update detecting means 1002 instructs the updated image storage control means 1003 to store the image displayed in the display means 602 in the storage means 603, and goes to step 1103.

(Step 1103) The image update detecting means 1002 clears the area accumulation result S to 0, and terminates the process.

A specific example of the operation of the image update detecting means 1002 operating in this manner is explained by referring to FIG. 12. FIGS. 12(a), (b), and (c) show images displayed by the display means 602, appearing at time T, time T+1 second, and time T+2 seconds, respectively, that is, the time noticed to the image update detecting means 1002 by the clock means 1001 upon lapse of 1 second each. The image at time T, that is, image (a) is supposed to be stored in the storage means 603. Since the updated area from the image (a) at time T of the image (b) at time T+1 second is less than ½, for example, ⅛, the image update detecting means 1002 does not instruct the updated image storage means 1003 to store the image. The updated area from the image (a) at time T of the image (c) at time T+2 seconds is more than ½, for example, ⅔ is updated, and, at this point, the image update detecting means 1002 instructs the updated image storage means 1003 to store the image, and as a result, the image (c) is stored in the storage means 603.

Thus, according to the embodiment, since the image is stored automatically when the updated area of the image transmitted from the data processing apparatus exceeds a specified value, principal images can be stored without user's instruction by detecting principal changes of the images updated occasionally by manipulation.

In the embodiment, in response to notice of lapse of specified time by the clock means 1001, the image update detecting means 1002 detects updating of image, but instead of detection of image updating by mere time interval, for example, when the wireless communication means does not receive image data frequently, it may be designed to operate the image update detecting means upon every reception of data in specified unit.

Also in the embodiment, it is intended to accumulate the updated areas as the image update detecting means 1002 is monitoring the image data received in the wireless communication means 601, but instead of monitoring the received image data, by detecting the differential portion of the image displayed in the display means, it may be also designed to judge whether or not to instruct storing of image.

(Embodiment 6)

Figure 13:
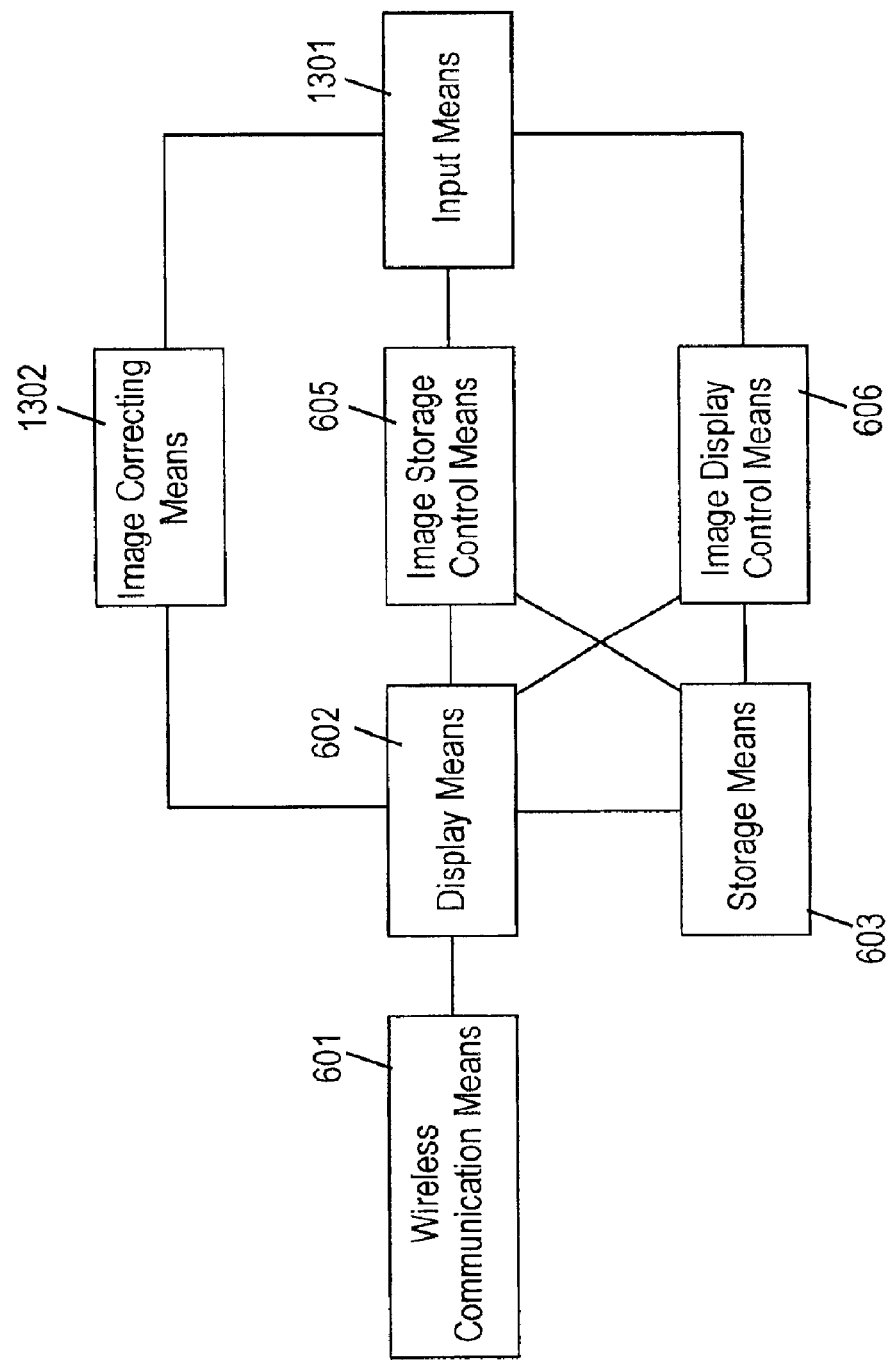
FIG. 13 is a block diagram of an image display apparatus in a sixth embodiment of the invention.

FIG. 13 is a block diagram of an image display apparatus in a sixth embodiment of the invention. In FIG. 13, wireless communication means 601, display means 602, storage means 603, image storage control means 605, and image display control means 606 are same as in the fourth embodiment shown in FIG. 6, and the explanation is omitted.

Input means 1301 processes user's update manipulation of the image stored in the storage means 603 into an image displayed in the display means 602. More specifically, the display means 602 includes an LCD, and a touch panel mounted on the LCD surface composes a part of the input means 1301. The touch panel is manipulated by a pen or the like, and can be manipulated by moving in pen down, pen up, pen down state, and by these manipulations, it is possible to draw additionally to the image displayed in the display means 602. Further, the input means 1301 receives various instructions by the user, at least an instruction for transition to a state capable of drawing on the image data being displayed in the display means 602 stored in the storage means 603, an instruction for storing the image data (including the data drawn by the user) being displayed in the display means 602 in the storage means 603, and an instruction for displaying a specified one of the image data stored in the storage means 603 in the display means 602.

An appearance of the image display apparatus in the embodiment including the display means 602 and input means 1301 is shown in FIG. 14(*a*). In FIG. 14(*a*), reference numeral 1401 denotes an integrated structure of an LCD for composing the display means 602 and the touch panel for composing input means 1301, showing one of the images stored in the storage means 603. An add button 1402 is for adding by using the touch panel to the image displayed in the display means 602 stored in the storage means 603. A store button 1403 is for storing the image (including the data drawn by the user) being presently displayed into the storage means 603 whether stored or not in the storage means 603. A display button 1404 is for instructing to display the images stored in the storage means 603 sequentially in the display means 602 every time the button is pressed.

Image updating means 1302 updates the image displayed in the display means 602 stored in the storage means 603 according to the instruction from the input means 1301. For example, the image shown in FIG. 14(*a*) is updated as shown in FIG. 14(*b*) by the user manipulation through the input means 1301. This is a state showing a check list document for finally confirming of closing of a door, and a check mark is additionally given in the check column.

After thus updating the displayed image, by pressing the store button 1403, the image updated by the user is stored in the storage means 603.

Thus, according to the embodiment, by wireless communication transmitted from the data processing apparatus, not only the image data displayed in the display means 602 is stored in the storage means 603, but also addition or revision is given to the stored image data when displayed in the display means 602, and the revised data can be also stored. Hence, in addition to the display of the stored data, it can be also edited as desired, so that the convenience is enhanced in the event of failure of wireless communication.

In the embodiment, the image editing function of the input means 1301 is only drawing on the image, but it may be also provided with other editing functions such as delete, move, copy and paste.

(Embodiment 7)

Figure 15:
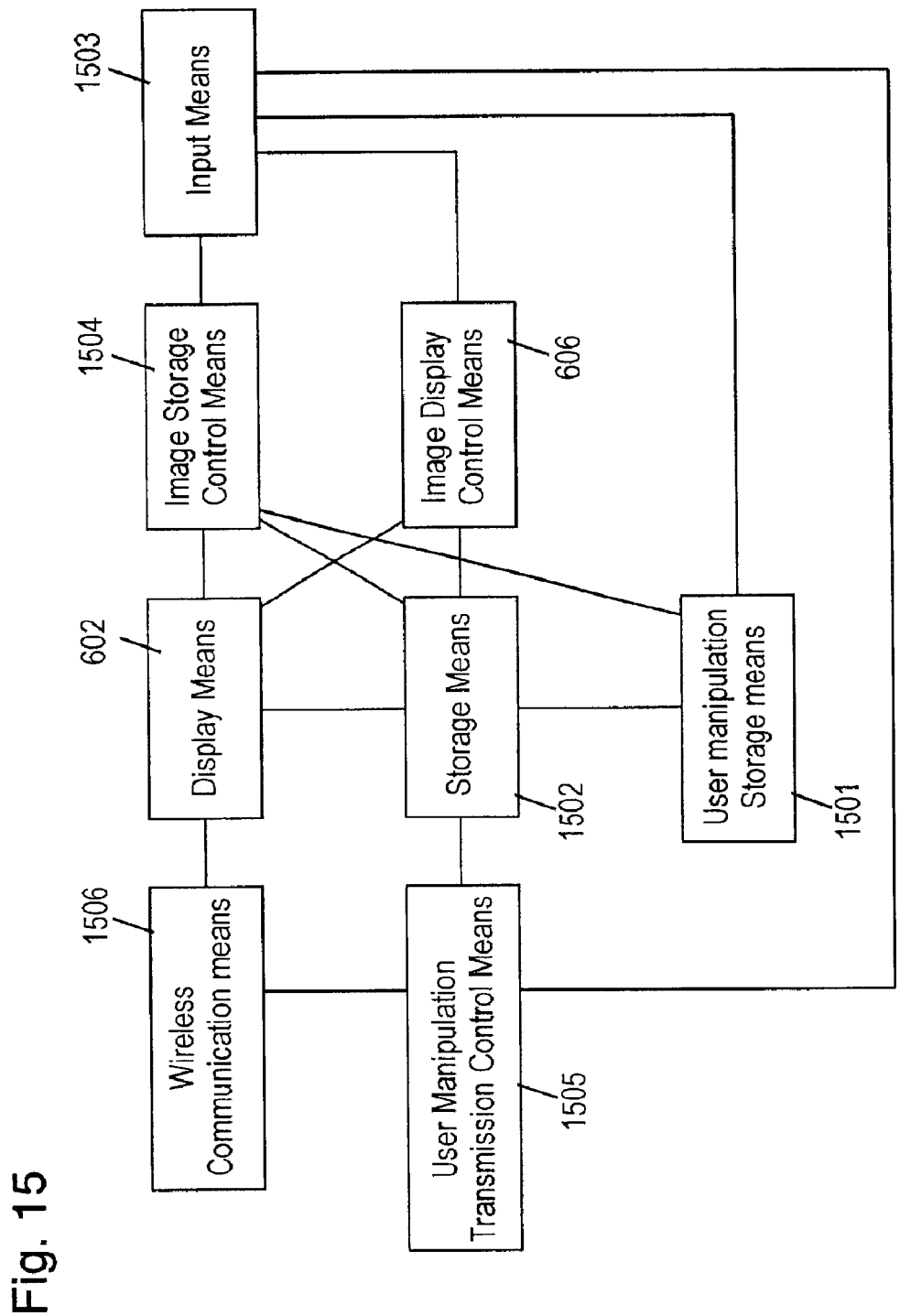
FIG. 15 is a block diagram of an image display apparatus in a seventh embodiment of the invention.
Figure 17:
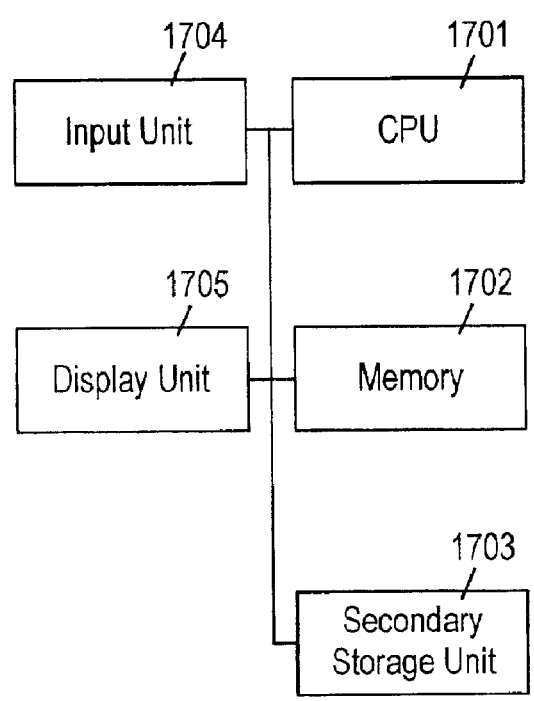
FIG. 17 is a block diagram showing a hardware configuration of an information processing apparatus in a prior art.
Figure 18:
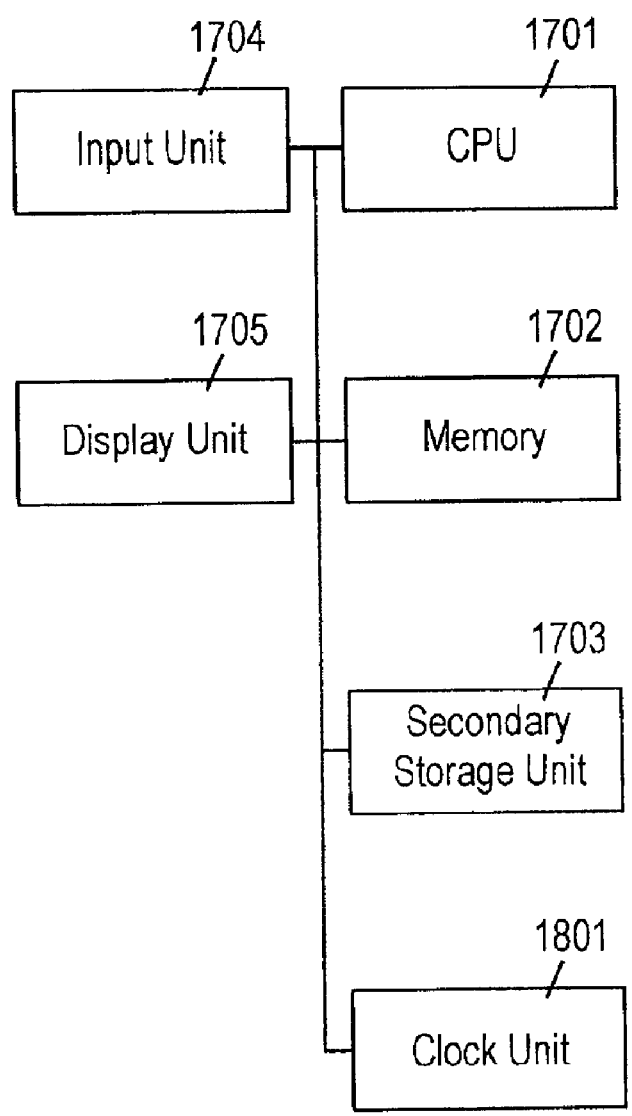
FIG. 18 is a block diagram showing a hardware configuration of an information processing apparatus in other prior art.

FIG. 15 is a block diagram of an image display apparatus in a seventh embodiment of the invention. In FIG. 15, display means 602 and image display control means 606 are same as in the fourth embodiment shown in FIG. 6, and the explanation is omitted.

User manipulation storage means 1501 stores temporarily a series of user manipulations on the images displayed in the display means 602, that is, the contents of manipulation and order. For example, the information of instruction in the order of coordinates (101, 205), (95, 303), (97, 397), (105, 502) on the LCD of the display means 602 is stored.

Storage means 1502 stores the images displayed in the display means 602, and the series of user manipulations temporarily stored in the user manipulation storage means 1501, in correspondence to each other.

Input means 1503 processes user's instruction manipulation to the image displayed in the display means 602 of the images stored in the storage means 1502. Specifically, the display means 602 includes an LCD, and the touch panel mounted on the LCD surface forms a part of the input means 1503. The touch panel is manipulated by a pen or the like, and can be manipulated by moving in pen-down, pen-up, pen-down state, and by these manipulations, an instruction is given to the image displayed in the display means 602. The series of user's instruction manipulations through the input means 1503 is sequentially stored in the user manipulation storage means 1501. Further, the input means 1503 receives various instructions by the user, at least an instruction for changing to an instruction enable state on the image data displayed in the display means 602 stored in the storage means 1502, an instruction for storing the image data displayed in the display means 602 and the corresponding series of user manipulations stored in the user manipulation storage means 1501, an instruction for displaying a desired one of the image data stored in the storage means 1502 in the display means 602, and an instruction of transmitting the series of user manipulations corresponding to the specified image of the images stored in the storage means 1502 to the data processing apparatus through wireless communication means 1506.

The appearance of the image display apparatus of the embodiment including the display means 602 and input means 1503 is shown in FIG. 16(*a*). In FIG. 16(*a*), reference numeral 1601 is an integrated structure of LCD for composing the display means 602 and touch panel for composing a part of the input means 1503, showing one of the images stored in the storage means 1502.

An instruction button 1602 is a button for changing to an instruction enable state by using the touch panel, on the image displayed in the display means 602 stored in the storage means 1502.

A store button 1603 is a button for storing the image being presently displayed, whether stored in the storage means 1502 or not, and the series of user manipulations stored in the user manipulation storage means 1501 corresponding to this image in the storage means 1502.

A display button 1604 is for instructing to display the images stored in the storage means 1502 sequentially in the display means 602 every time the button is pressed.

A transfer button 1605 is a button for instructing to transmit the series of user manipulations corresponding to the images displayed in the display means 602 stored in the storage means 1502 to the data processing apparatus.

Image storage control means 1504 stores the image data being displayed in the display means 602, and the corresponding series of user manipulations stored in the user manipulation storage means 1501, at a specified position in the storage means 1502, according to the input from the input means 1503.

User manipulation transmission control means 1505 instructs the wireless communication means 1506 to transmit the information of the series of user manipulations stored in the storage means 1502 to the data processing apparatus according to the input from the input means 1503.

Wireless communication means 1506 receives image data transmitted from the data processing apparatus (not shown) for generating images sequentially through wireless communication, and transmits the information of the series of user manipulations to the data processing apparatus according to the instruction from the user manipulation transmission control means 1505.

In the image display apparatus of the embodiment having such configuration, typical examples of operation are given below.

(1) Receiving image data from the data processing apparatus through the wireless communication means 1506 by wireless communication, an image as shown in FIG. 16(*b*) is displayed on the display means 602. This image displays a document of check list for "final checking" of closing of a door. Square boxes at the left side of this document are parts of the software for checking the items, and when the position is directly instructed, a check mark is displayed automatically, and this document has a function of setting in a state of checking corresponding items. Herein, centers of check marks 1611 to 1614 are coordinates (100, 200), (100, 300), (100, 400), and (100, 500) on the screen, and each check mark is 20 in both width and height.

(2) While this document is being displayed, when the store button 1603 is pressed, the entire screen is stored in the storage means 1502.

(3) The user carries the image display apparatus of the embodiment, and moves to a place for "final checking" where wireless communication with the data processing apparatus is disabled. Since wireless communication is not possible, image data cannot be received from the data processing apparatus.

(4) By manipulating the display button 1604, the previously stored image is displayed in the display means 602, and then by manipulating the instruction button 1602, it is set in a state for instructing the image being displayed. At this moment, the appearance of the image display apparatus is same as shown in FIG. 16(*b*).

(5) The user checks according to the content of the image displayed in the display means 602 at the place for final checking, and instructs the square boxes 1611 to 1614 sequentially according to the result of checking.

(6) The user, after completion of final checking, presses the store button 1603, and the image data being displayed is stored in the storage means 1502 in correspondence to the instruction content. Specifically, the image of FIG. 16(*b*) shown in the display means 602, and the data telling that the coordinates (101, 205), (95, 303), (97, 397), (105, 502) are instructed sequentially are stored in correspondence to each other.

(7) The user, when returning to a place recovering wireless communication with the data processing apparatus, pushes the transfer button 1605, and the data telling that the coordinates (101, 205), (95, 303), (97, 397), (105, 502) are instructed sequentially is transmitted to the data processing apparatus through the wireless communication means 1506.

(8) The data processing apparatus processes that the position corresponding to the original document has been instructed, and returns the image data to the image display apparatus. Herein, since all received coordinates are included inside the four check marks, and the check marks are displayed in the image as shown in FIG. 16(*c*), and the document is set in a state of completed checking of corresponding items.

According to the embodiment, the instruction to the image stored in the storage means in a state unable to communicate wireless with the data processing apparatus is stored, and when returning to a state capable of communicating wireless with the data processing apparatus, the information relating to the instruction is transmitted to the data processing apparatus, and therefore even in a situation unable to communicate wireless, the same manipulation as in the wireless communication enabled state can be done on the data processing apparatus.

In the embodiment, the user manipulation stored in the user manipulation storage means and storage means is a mere series of coordinates, but by combining them with the time information, it is also applicable to a manipulation defined by the timing of manipulation, such as time difference of one instruction and next instruction.

As described herein, according to the invention, the information processing system is divided into the data processing apparatus and image display apparatus, which are not required to be connected by cable or the like, and only the image display apparatus can be brought in and used.

In the information processing system divided into the data processing apparatus and image display apparatus, when the wireless quality is poor and the user manipulation cannot be transmitted to the data processing apparatus or the image cannot be transmitted to the image display apparatus, the screen display is turned off, and useless screen display can be suppressed.

Also in the information processing system divided into the data processing apparatus and image display apparatus, when restoring the screen display from the screen display off state for the purpose of saving of power or prevention of heat generation, since the screen can be presented to the user immediately by the image temporary storage unit, and hence the response to the user manipulation can be enhanced.

In the image display apparatus connected to the data processing apparatus by wireless communication in this information processing system, even in a situation unable to communicate wireless, the means for displaying the image preliminarily stored by the user manipulation or the like is presented. It further presents the means for storing the image automatically according to a prescribed condition, editing the image by adding or updating, or reflecting manipulation on the image to the data processing apparatus. By these means, even in a case impossible to communicate wireless with the data processing apparatus, the document display apparatus can be effectively utilized, and hence its practical effects are significant.

What is claimed is:

1. An image display apparatus for wireless-communicating with a data processing apparatus generating image data and wireless-transmitting the image data, and for displaying the image data received from said data processing apparatus, comprising:
   a wireless unit;
   a display unit;
   an input unit; and
   a wireless quality measuring unit for measuring a wireless quality,
   wherein a user's input manipulation result in said input unit is transmitted to said data processing apparatus by said wireless unit, and
   wherein image data of an image to be displayed by said display unit as a result of information processing in said data processing apparatus based on the input manipulation result is received in said wireless unit, and displayed in said display unit, and
   wherein a display screen of said display unit is turned off when said wireless quality measuring unit judges that the wireless quality is inferior to a specified quality.

2. The image display apparatus of claim 1 further comprising an image temporary storage unit for temporarily storing the image data displayed in said display unit, wherein:
   when a display screen of said display unit is turned off, image data shown in said display unit is stored in said image temporary storage unit,
   the stored image data is displayed first when said display screen is turned on by a user's input manipulation,
   and then the stored image data is updated to a latest image data transmitted from said data processing apparatus.

3. An information processing system comprising:
   an image display apparatus including a first wireless unit, a display unit, and an input unit, and
   a data processing apparatus including a CPU, a memory, and a second wireless unit,
   wherein a user's input manipulation result, in said input unit of said image display apparatus, is transmitted to said data processing apparatus by said first wireless unit,
   said data processing apparatus transmits image data of an image to be displayed by said display unit of said image display apparatus as a result of information processing based on a received content at said second wireless unit to said image display apparatus through said second wireless unit, and
   said image display apparatus displays the image data received at said first wireless unit in said display unit,
   wherein said image display apparatus further comprises a wireless quality measuring unit for measuring the wireless quality, and
   a display screen of said display unit is turned off when said wireless quality measuring unit judges that a wireless quality is inferior to a specified quality.

4. The information processing system of claim 3, wherein:
   when said display screen of said display unit is turned off, the image data shown in said display unit is stored,
   the stored image data is displayed first when said display screen is turned on by a user's input manipulation, and
   then the stored image data is updated to a latest image data transmitted from said data processing apparatus.

5. The information processing system of claim 3, wherein the image data transmitted from said second wireless unit to said first wireless unit is a differential portion only.

6. The information processing system of claim 4, wherein the image data transmitted from said second wireless unit to said first wireless unit is a differential portion only.

7. An image display apparatus for wireless-communicating with a data processing apparatus generating image data and wireless-transmitting the image data, and for displaying the image data received from said data processing apparatus, comprising:
   wireless communication means for receiving image data;
   display means for displaying the image data received by said wireless communication means;
   storage means for storing the image data;
   input means for receiving a user's instruction;
   image storage control means for storing, in said storage means, the image data displayed in said display means according to an image storing instruction received in said input means,
   image display control means for displaying, in said display means, the image or the image data stored in said storage means according to an image display instruction received in said input means,
   wherein the image data received by said wireless communication means is image data of an image to be displayed by said display means
   said storage means stores a series of user manipulation of each image data in correspondence to each image data in addition to the image data,
   said input means further receives the user manipulation of the image data stored in said storage means and displayed in said display means and stores the series temporarily,
   said image storage control means stores, in said storage means, the series of the user manipulation stored in said input means in correspondence to the image data in addition to the image data, and
   said wireless communication means transmits the user manipulation to said data processing apparatus aside from receiving the image data.

8. An image display apparatus for wireless-communicating with a data processing apparatus generating an image data and wireless-transmitting the data, and for displaying the image data received from said data processing apparatus, comprising:
   wireless communication means;
   display means for displaying the image data received in said wireless communication means;
   storage means for storing the image data;
   image update detecting means for detecting an updating of the image data displayed in said display means;
   updated image storage control means additionally storing, in said storage means, the image data displayed by said display means in said storage means in response to detecting the updating of the image data by said image update detecting means;

input means for receiving a user's instruction; and image display control means for displaying, in said display means, the image data stored in said storage means according to an image display instruction received in said input means, wherein said image update detecting means detects the updating of the image data when an amount of the image data updated within a specified time is larger than a predetermined amount, said storage means stores a series of user manipulation of each image data in correspondence to the each image data in addition to the image data;

said input means further receives the user manipulation of the image data stored in said storage means and displayed in said display means and stores the series temporarily, said image storage control means stores, in said storage means, the series of the user manipulation stored in said input means in correspondence to the image data in addition to the image data, and said wireless communication means transmits the user manipulation to said data processing apparatus aside from receiving the image data.

9. An image display apparatus for wireless-communicating with a data processing apparatus generating image data and wireless-transmitting the image data, and for displaying the image data received from said data processing apparatus, comprising:

wireless communication means for receiving image data;

display means for displaying the image data received by said wireless communication means;

storage means for storing the image data;

input means for receiving a user's instruction;

image storage control means for storing, in said storage means, the image data displayed in said display means according to an image storing instruction received in said input means;

image display control means for displaying, in said display means, the image or the image data stored in said storage means according to an image display instruction received in said input means, wherein the image data received by said wireless communication means is image data of an image to be displayed by said display means;

image updating means for updating the image data stored in said storage means and displayed in said display means according to an image updating instruction received in said input means;

said storage means stores a series of user manipulation of each image data in correspondence to the each image data in addition to the image data, said input means further receives the user manipulation of the image data stored in said storage means and displayed in said display means and stores the series temporarily, said image storage control means stores, in said storage means, the series of the user manipulation stored in said input means in correspondence to the image data in addition to the image data, and said wireless communication means transmits the user manipulation to the data processing apparatus, aside from receiving the image data.

10. An image display apparatus for wireless-communicating with a data processing apparatus generating an image data and wireless-transmitting the data, and for displaying the image data received from said data processing apparatus, comprising:

wireless communication means;

display means for displaying the image data received in said wireless communication means;

storage means for storing the image data;

image update detecting means for detecting an updating of the image data displayed in said display means;

updated image storage control means for additionally storing, in said storage means, the image data displayed by said display means in said storage means in response to detecting the updating of the image data by said image update detecting means;

input means for receiving a user's instruction; and image display control means for displaying, in said display means, the image data stored in said storage means according to an image display instruction received in said input means, wherein said image update detecting means detects the updating of the image data when an amount of the image data updated within a specified time is larger than a predetermined amount, further comprising image updating means for updating the image data stored in said storage means and displayed in said display means according to an image updating instruction received in said input means;

said storage means stores a series of user manipulation of each image data in correspondence to the each image data in addition to the image data, said input means further receives the user manipulation of the image data stored in said storage means and displayed in said display means and stores the series temporarily, said image storage control means stores, in said storage means, the series of the user manipulation stored in said input means in correspondence to the image data in addition to the image data, and said wireless communication means transmits the user manipulation to said data processing apparatus aside from receiving the image data.

11. An image display apparatus for wireless-communicating with a data processing apparatus generating image data and wireless-transmitting the image data, and for displaying the image data received from said data processing apparatus, comprising:

wireless communication means;

display means for displaying the image data received in said wireless communication means;

storage means for storing the image data;

input means for receiving a user's instruction;

image storage control means for storing, in said storage means, the image data displayed in said display means according to an image storing instruction received in said input means; and image display control means for displaying, in said display means, the image data stored in said storage means according to an image display instruction received in said input means, wherein said storage means stores a series of user manipulation of each image data in correspondence to each image data in addition to the image data, said input means further receives the user manipulation of the image data stored in said storage means and displayed in said display means and stores the series temporarily, said image storage control means stores, in said storage means, the series of the user manipulation stored in said input means in correspondence to the image data in addition to the image data, and said wireless communication means transmits the user manipulation to said data processing apparatus aside from receiving the image data.

12. The image display apparatus of claim 11, further comprising image updating means for updating the image data stored in said storage means and displayed in said display means according to an image updating instruction received in said input means.

13. An image display apparatus for wireless-communicating with a data processing apparatus generating an image data and wireless-transmitting the data, and for displaying the image data received from said data processing apparatus, comprising:

wireless communication means;

display means for displaying the image data received in said wireless communication means;

storage means for storing the image data;

image update detecting means for detecting an updating of the image data displayed in said display means;

updated image storage control means for additionally storing, in said storage means, the image data displayed in said display means in said storage means in response to detecting the updating of the image data by said image update detecting means;

input means for receiving a user's instructions; and image display control means for displaying, in said display means, the image data stored in said storage means according to an image display instruction received in said input means, wherein said storage means stores a series of user manipulation of each image data in correspondence to each image data in addition to the image data, said input means further receives the user manipulation of the image data stored in said storage means and displayed in said display means and stores the series temporarily, said image storage control means stores, in said storage means, the series of the user manipulation stored in said input means in correspondence to the image data in addition to the image data, and said wireless communication means transmits the user manipulation to said data processing apparatus aside from receiving the image data.

14. The image display apparatus of claim 13, wherein said image update detecting means detects the updating of the image data when an amount of the image data updated within a specified time is larger than a predetermined amount.

15. The image display apparatus of claim 14, further comprising image updating means for updating the image data stored in said storage means and displayed by said display means according to an image updating instruction received in said input means.

16. An information processing system comprising:

an image display apparatus including first wireless unit, a display unit, and an input unit, and a data processing apparatus including a CPU, a memory, and a second wireless unit, wherein a user's input manipulation result, in said input unit of said image display apparatus, is transmitted to said data processing apparatus by said first wireless unit, said data processing apparatus transmits image data of a result of information processing based on a received content at said second wireless unit to said image display apparatus through said second wireless unit, and said image display apparatus displays the image data received at said first wireless unit at said display unit, wherein the image data transmitted from said second wireless unit to said first wireless unit is a differential portion only, said image display apparatus further comprises a wireless quality measuring unit for measuring the wireless quality, and a display screen of said display unit is turned off when said wireless quality measuring unit judges that a wireless quality is inferior to a specified quality.

17. An information processing system comprising:

an image display apparatus including first wireless unit, a display unit, and an input unit, and a data processing apparatus including a CPU, a memory, and a second wireless unit, wherein a user's input manipulation result in said input unit of said image display apparatus for operating said data processing apparatus is transmitted to said data processing apparatus by said first wireless unit, said data processing apparatus transmits image data of a result of information processing based on a received content at said second wireless unit to said image display apparatus through said second wireless unit, said image display apparatus displays the image data received at said first wireless unit in said display unit, said image display apparatus further comprises a wireless quality measuring unit for measuring the wireless quality, and a display screen of said display unit is turned off when said wireless quality measuring unit judges that a wireless quality is inferior to a specified quality.

18. An image display apparatus for wireless-communicating with a data processing apparatus generating image data and wireless-transmitting the image data, and for displaying the image data received from said data processing apparatus comprising:

wireless communication means;

display means for displaying the image data received in said wireless communication means;

storage means for storing the image data;

input means for receiving a user's instruction;

image storage control means for storing, in said storage means, the image data displayed in said display means according to an image storing instruction received in said input means; and image display control means for displaying, in said display means, the image data stored in said storage means according to an image display instruction received in said input means, wherein said storage means stores a series of user manipulation of each image data in correspondence to each image data in addition to the image data, wherein said input means further receives the user manipulation of the image data stored in said storage means and displayed in said display means and stores the series temporarily, wherein said image storage control means stores, in said storage means, the series of the user manipulation stored in said input means in correspondence to the image data in addition to the image data, and wherein said wireless communication means transmits the user manipulation to said data processing apparatus aside from receiving the image data.

19. The image display apparatus of claim 18, further comprising image updating means for updating the image data stored in said storage means and displayed in said display means according to an image updating instruction received in said input means.

20. An image display apparatus for wireless-communicating with a data processing apparatus generating an image data and wireless-transmitting the data, and for displaying the image data received from said data processing apparatus, comprising:

wireless communication means;

display means for displaying the image data received in said wireless communication means;

storage means for storing the image data;

image update detecting means for detecting an updating of the image data displayed in said display means;

updated image storage control means for additionally storing, in said storage means, the image data displayed by said display means in said storage means in response to detecting the updating of the image data by said image update detecting means;

input means for receiving a user's instruction; and image display control means for displaying, in said display means, the image data stored in said storage means according to an image display instruction received in said input means, wherein said storage means stores a series of user manipulations of each image data in correspondence to the each image data in addition to the image data, wherein said input means further receives the user manipulation of the image data stored in said storage means and displayed in said display means and stores the series temporarily, wherein said image storage control means stores, in said storage means, the series of the user manipulations stored in said input means in correspondence to the image data in addition to the image data, and wherein said wireless communication means transmits the user manipulation to said data processing apparatus aside from receiving the image data.

21. The image display apparatus of claim 20, wherein said image update detecting means detects the updating of the image data when an amount of the image data updated within a specified time is larger than a predetermined amount.

22. The image display apparatus of claim 21, further comprising image updating means for updating the image data stored in said storage means and displayed in said display means according to an image updating instruction received in said input means.

23. The image display apparatus of claim 20, further comprising image updating means for updating the image data stored in said storage means and displayed in said display means according to an image updating instruction received in said input means.

* * * * *

UNITED STATES PATENT AND TRADEMARK OFFICE
CERTIFICATE OF CORRECTION

PATENT NO.    : 6,844,870 B2
DATED         : January 18, 2005
INVENTOR(S)   : Masaki Mukai et al.

It is certified that error appears in the above-identified patent and that said Letters Patent is hereby corrected as shown below:

Column 18,
Line 29, "or" should read -- of --.

Column 19,
Line 39, "or" should read -- of --.

Column 22,
Line 18, between "including" and "first", insert -- a --.

Signed and Sealed this

Twelfth Day of July, 2005

JON W. DUDAS
*Director of the United States Patent and Trademark Office*